(12) United States Patent
Bos

(10) Patent No.: US 7,362,231 B2
(45) Date of Patent: Apr. 22, 2008

(54) HAND PRESSURE SENSOR WARNING DEVICE

(76) Inventor: Arie Cornelis Bos, 67, s-Gravendijkwal, Rotterdam (NL) NL-3021EE ( * ) Notice: Subject to any disclaimer, the term of this patent is extended or adjusted under 35 U.S.C. 154(b) by 431 days.

(21) Appl. No.: 11/026,162

(22) Filed: Jan. 3, 2005

(65) Prior Publication Data

US 2005/0134470 A1   Jun. 23, 2005

(51) Int. Cl.
*G08B 21/00* (2006.01)
*A61B 5/22* (2006.01)
*A63B 21/02* (2006.01)
*A63B 57/00* (2006.01)
*A63B 69/36* (2006.01)

(52) U.S. Cl. .......... 340/665; 340/573.1; 340/575; 340/576; 340/668; 73/379.01; 73/379.03; 473/201; 473/202

(58) Field of Classification Search .......... 340/665, 340/573.1, 575–576, 668; 73/379.01, 379.03; 473/201–202, 299, 453

See application file for complete search history.

(56) References Cited

U.S. PATENT DOCUMENTS

| 4,510,353 A | | 4/1985 | Nemitz | |
|---|---|---|---|---|
| 4,861,034 A | * | 8/1989 | Lee | 473/202 |
| 4,930,785 A | * | 6/1990 | Mills | 473/202 |
| 5,226,650 A | * | 7/1993 | Suttner | 473/463 |
| 5,236,190 A | * | 8/1993 | Moss | 473/450 |
| 5,377,541 A | | 1/1995 | Patten | |
| 5,419,563 A | * | 5/1995 | Abrams et al. | 473/202 |
| 5,439,216 A | * | 8/1995 | Ganger, Sr. | 473/463 |
| 5,439,217 A | * | 8/1995 | Ganger, Sr. | 473/202 |
| 5,447,167 A | * | 9/1995 | Fleischaker | 600/595 |
| 5,542,676 A | | 8/1996 | Howe, Jr. et al. | |
| 5,681,993 A | * | 10/1997 | Heitman | 73/379.02 |
| 5,733,201 A | * | 3/1998 | Caldwell et al. | 473/202 |
| 6,377,541 B1 | * | 4/2002 | Boetzel | 370/216 |
| 6,419,601 B1 | * | 7/2002 | Kenner | 473/552 |
| 6,716,034 B2 | * | 4/2004 | Casanova et al. | 434/252 |
| 6,923,727 B1 | * | 8/2005 | Jacobs | 473/206 |
| 7,074,198 B2 | * | 7/2006 | Krullaards | 600/587 |

FOREIGN PATENT DOCUMENTS

EP   0322515   7/1989

* cited by examiner

*Primary Examiner*—Benjamin C. Lee
*Assistant Examiner*—Lam Pham
(74) *Attorney, Agent, or Firm*—Morland C. Fischer

(57) ABSTRACT

An ergonomic lightweight hand pressure sensor-warning device for use with hand held objects like sport devices, steering devices, writing devices or computer devices, as well as the method for its assembly. This new hand pressure sensor warning device is designed as a relatively thin plaster/band-aid to attach the device onto the outside surface of the handgrips of hand held devices like a golf club, making the attachment to and detachment from the hand held device very simple and user-friendly. The device contains an electrical membrane switch, an electrical indicator with an alarm device and a streamlined oblong housing element which contains the principal components in a compact unit. Due to its low manufacturing costs, the warning device is also highly attractive as a commercial advertising product and as a corporate gift or premium product. The unintended and unexpected detachment of the device during a golf swing is practically impossible.

12 Claims, 27 Drawing Sheets

HAND PRESSURE SENSOR WARNING DEVICE

CROSS REFERENCES TO RELATED APPLICATIONS

This patent application claims priority from Netherlands Application No. 1021045 filed Jul. 10, 2002, Netherlands Application No. 1022654 filed Feb. 12, 2003, and PCT Application No. EP20/03007481 filed Jul. 10, 2003.

BACKGROUND OF THE INVENTION

1. Field of the Invention

The invention relates to an ergonomic lightweight hand pressure sensor-warning device, for use with handheld objects like sport devices, steering devices, writing devices or computer devices, as well as the method for its assembly.

The invention also relates to an assembly method of a hand pressure sensor warning device. The invention also relates to a membrane switch for use in a hand pressure sensor warning device.

2. Background Art

The warning device is used to correct handgrip forces applied to handgrips of handheld objects or equipment, in particular for use with sports devices including but not limited to tennis, squash, badminton, table tennis, baseball, cricket, hockey, fencing, billiards, pool, shooting sports, rowing, skiing, etc. and also for use by drivers of vehicles, boats and ships, for use by machine operators, medical personnel and other applications to correct grip pressure exerted on the handheld object or equipment and to improve performance or to prevent muscle stress or the risk of injury. The invention can also be used to correct hand- and finger forces on handheld writing tools, such as pens and pencils during writing or on hand operated computer interface devices such as a computer mouse. The ergonomic lightweight hand pressure sensor warning device also serves to correct hand pressure forces on the steering wheel of a vehicle or helm of a vessel or the control handle of aircraft, helicopters, and other industrial machines.

To perform a correct hit or hand movement, for example, with tennis, squash, badminton, table tennis, baseball, softball, cricket, hockey, fencing, billiard, shooting sports, rowing, in which different equipment is held in one or both hands, is difficult to learn, especially when precision and grip strength is important for the level of performance. Inadequate grip strength or too much grip strength deteriorates performance and can result in injuries, caused by incorrect handgrip or handgrip forces. In certain cases, excessive handgrip forces can cause muscle or joint injuries in the fingers, hands, wrist, elbows, arms, shoulders and back.

Known devices are described in U.S. Pat. No. 5,377,541 and WO 95/311258, which in the golf world are known as the "Smartgrip". Both devices are mainly constructed from sensor elements with accompanying electronics, power supply and sound device, all attached to the handgrip of a golf club by means of a spirally wrapped band with "C" clips (or internally attached) according to U.S. Pat. No. 5,377,541 or by means of a cylindrical flexible hose according to WO 95/311258.

Another known device according to WO 99/27853 encloses a capacitive sensor constructed from different pressure sensitive conductive plates with isolating layers in between and integrated in a handgrip area of a racquet, bat, club or other equipment. Simple installation on a racquet, bat, club or other equipment by an end-user is not possible. Further this very sensitive hardware can not be removed for repair or maintenance without the help of an expert. The capacitive pressure sensors are very sensitive to temperature changes and moisture. This prevents a long-life guarantee. Such capacitive sensors with an adequate power supply and miscellaneous electronic components are rather expensive, which results in substantially higher production costs for a racquet, bat or other equipment using such technology.

Another disadvantage of this and of all other known warning devices is the large physical mass required. This substantially influences the appropriate moment of inertia of the golf club, racquet, bat or other equipment. Hits and movements learned with such a warning device need to be learned again without the use of these training aids, or with conventional racquets, bats and other equipment. Due to the high cost price, these types of warning device are not suitable for premium and or promotional give-away products. The known warning devices are too big, too heavy, too complicated and too expensive to be used with small handheld devices like pens or computer mouse's.

SUMMARY OF THE INVENTION

By using the present invention, the abovementioned drawbacks are eliminated and new features are added.

The hand pressure sensor-warning device according to the invention comprises the following elements:

1. An electrical membrane switch comprising a first and a second membrane layer, each membrane layer having contact areas comprising electric conducting material with the membrane switch being electrically interconnected to the electrical indicator;
2. An electrical indicator mainly containing a circuit board provided with power supply, the indicator being electrically interconnected to the integrated alarm signal device;
3. An integrated alarm signal device for generating an alarm signal, like an audio or light signal or a vibrating or buzzing signal;
4. A housing element covering the primary components, 1.1-to-1.3 in a compact unit; a part of the housing element being closely in contact with the membrane switch, whereby the alarm signal device generates an alarm signal when the membrane switch is closed by hand or finger pressure practiced on that part of the housing element which is in contact with the membrane switch.

This new hand pressure sensor warning device is designed as a relatively thin band-aid or sticking plaster to attach the warning device onto the outside surface of the handgrips of handheld devices, making the attachment to and detachment from the handheld device very simple and user-friendly. Secondly, the minimal dimensions and mass of the new device have a negligible influence on the appropriate moment of inertia of the hand held device. The unintended coming loose of the warning device from a handheld object during its use is not possible while the hand or finger presses the warning device against the object. Due to its low manufacturing costs, the warning device is also highly attractive as a commercial advertising product and as a corporate gift or premium product.

The related dimensions and masses of said elements are small, and two thin flat membrane layers correspond in dimensions with the grip area of the hand or fingers on the handgrip of the hand held devices like sport devices, steering devices, writing devices or computer devices.

The device is designed such that the exercise of pressure from the user's hands and/or fingers on the grips of the racquet, bat, club, stick, bow, ski, cue, rifle, pistol, wheel, handle, equipment control, knobs, pen, knife, computer mouse etc. is optimally transferred to the ergonomic light-weight hand pressure sensor-warning device, whereby, in order to indicate the correct application of single or double hand- and/or finger pressure, the membrane switch is calibrated on a hand pressure upper threshold and/or hand pressure lower threshold, or both, such that when the hand pressure upper threshold is reached or exceeded by the application of excessive hand pressure, the user is audibly, visually or physically warned; which hand pressure sensor-warning device can be attached to and detached from the equipment in use without disturbing its functionality. The extreme low mass of the hand pressure sensor-warning device is realized by using flexible electronic print foils or membrane layers and specially designed and placed membrane switches assembled from membrane layers as explained below.

The dimensions of the indicator, preferably attached on the first membrane layer, comprising the circuit board with power supply and also to the indicator attached integrated alarm device, allows placement of the thumbs of a user player during the use of the sports etc. device with the warning device.

The attachment of the warning device to the sport etc. device is preferably done by means of the double sided, adhesive tape, thereby eliminating the use of a band-system with "C" clips or the use of velcron tape. Unwanted coming loose of the warning device from the sports etc. device is very unlikely because the warning device is fully covered at least one hand during it use.

Method for assembling a hand pressure sensor warning device comprising the following steps:
1. placing the housing element up side down in a holder comprising vertical pins by pushing the housing element with the assembly openings over the corresponding pins,
2. attaching the membrane switch with indicator and optional an adhesive layer by means an attachment layer on the housing element and positioning the switch by pushing it over the vertical pins of the holder extending from the housing element,
3. optional attaching an adhesive layer on the membrane switch,
4. removing the assembled hand pressure sensor warning device from the holder by pulling it from the two pins.

Another important aspect of the invention is that the first and the second membrane layers of the membrane switch are mutually positioned and fixed at a distance by means of a perforated isolating layer between the two membrane layers. This perforated isolating layer can be a glue layer with regular openings, whereby the openings correspond to the contact areas of at least one membrane layer. In this way a simple, accurate hand pressure switch can be constructed, which can easily be adapted to its desired application by varying the contact areas and/or the perforated glue layer leading to a in this way adjustable threshold hand pressure value of the membrane switch to close. The isolating layer can have a constant thickness, but the thickness can also change e.g. linear over the length of the membrane layer when a difference in pressure sensitivity dependent of the position on the surface of the membrane switch is needed.

In this membrane switch according to the invention the first membrane layer preferably comprises two contact areas which areas are electrically interconnected to the indicator thus forming an open electrical circuit while the second membrane layer comprises contact areas which will close the electrical circuit on the first membrane layer when hand or finger pressure is exerted on the membrane switch.

Preferably whereby the first contact area of the first membrane layer consists of:
a first connecting strip extending longitudinally from the electrical indicator to the end edge of the membrane layer, said strip extending closely and being parallel to the first longitudinal edge of the membrane layer and
at least two, with the first connecting strip connected, parallel running side strips which extend widthwise in the direction of the second longitudinal edge perpendicular or at an angle relative to the first connecting strip, whereby the second contact area consists of
a second connecting strip extending longitudinally from the electrical indicator to the end edge of the membrane layer, said strip extending closely and being parallel to the second longitudinal edge of the membrane layer and of
at least two with the second connecting strip connected parallel running side strips which extend widthwise in the direction of the first longitudinal edge, in such a way that a side strip of the first contact area is always positioned adjacent and running parallel to a side strip of the second area.

In this way a long switch surface can be created with over its total surface a constant or varying pressure threshold value. Thus independent of where on the warning device the grip pressure of the user is exceeded the membrane switch will close and the alarm signal will be given. The contact areas of the second membrane can be parallel strips or can be areas placed inside domes formed in the second membrane layer.

To increase the flexibility of the membrane switch the second membrane layer can comprise cuts or grooves extending lengthwise thereby facilitating bending widthwise of the membrane switch perpendicular to its longitudinal axis for easy fit on a sport etc. device with a circular cross-section.

Preferably the domes formed in the second membrane layer are provided with cuts for lowering the hand or finger threshold value of the membrane switch. Preferably the electrical indicator is attached to the first membrane layer and connected to the contact areas of the first membrane layer, whereby the integrated alarm device is attached to the electrical indicator and where on top of the second membrane layer the housing element is attached covering the membrane layers of the membrane switch and covering in a bulge the electrical indicator with attached integrated alarm device. The hand pressure warning device can in this way be constructed at low cost and with dimensions which will fit most handgrips of sport etc. devices.

All individual components of the device can be mass-manufactured, as well as their assembly, allowing low final product lost. This makes it possible to use the device as a commercial advertising product, corporate gift or premium product.

BRIEF DESCRIPTION OF THE DRAWINGS

The invention will now be described according to the drawings.

DETAILED DESCRIPTION

Figure 1:
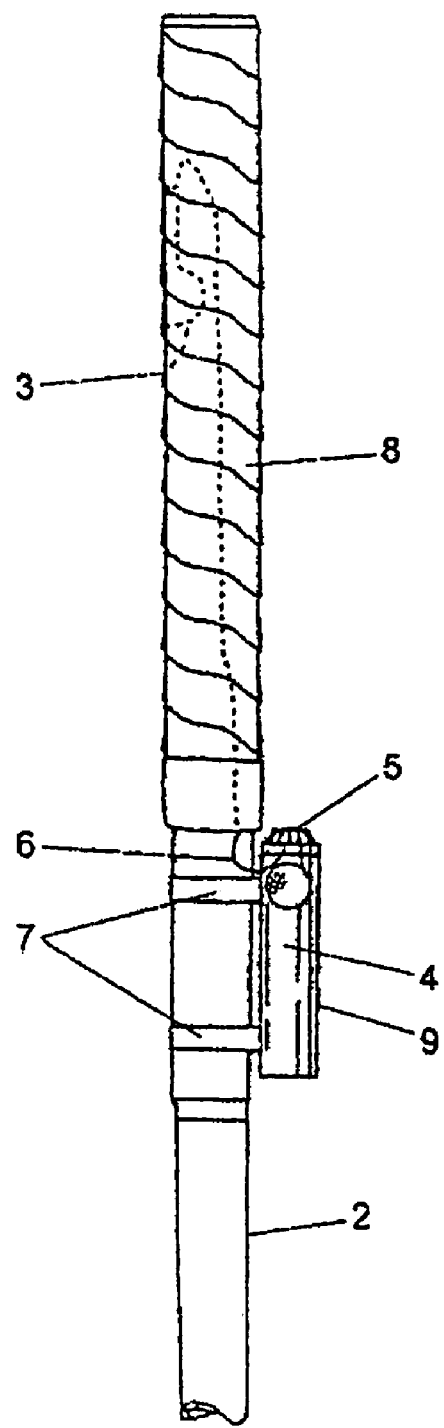
FIG. 1 shows a front view of a prior art golf club hand pressure sensor.

FIG. 1 shows the well known device for golf club handgrip training 1 according to U.S. Pat. No. 5,374,541. It contains a pressure sensor 3, which uses a spirally shaped band 8, fixed to the handgrip area of golf club 2. Pressure sensor 3 is connected by means of an electrical wire 6 with electrical indicator 4. Electrical indicator 4 is, together with connected alarm device 5 contained into the cylindrical housing element 9, which is fixed to the golf club 2 by means of "C" clips.

Figure 2:
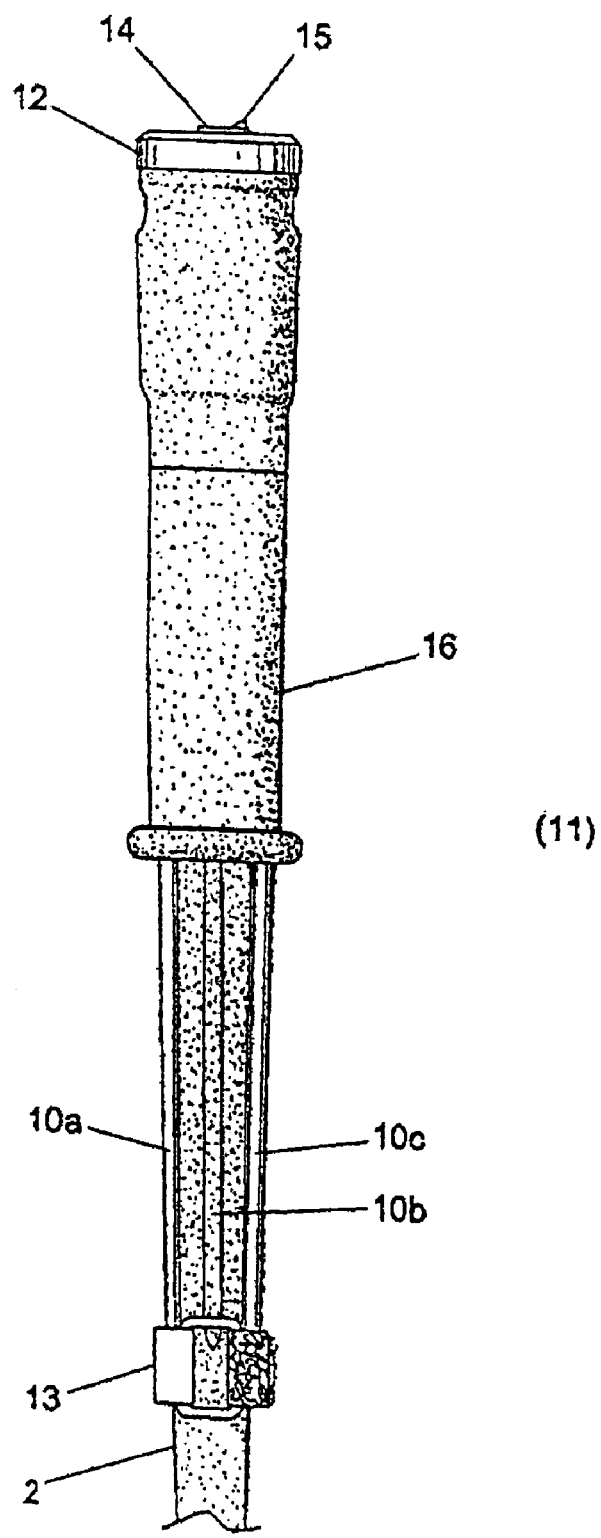
FIG. 2 shows a front view of another prior art golf club hand pressure sensor.

FIG. 2 shows the well known device for golf club handgrip training 11 according to WO 95/311258, which consists of oblong pressure sensor strips 10a, 10b and 10c, having pressure sensor elements (not shown), being positioned on golf club 2 by means of holder 12, and under-collar 13. The indicator (not shown) as well as the electronics (not shown) also are located in holder 12, and alarm device 14 and on/off switch 15 are located on its topside. Device 11 is fixed to golf club 2 by means of a cylindrical flexible hose 16, which is being pulled down from the top edge of holder 12 towards under-collar 13.

Figure 3:
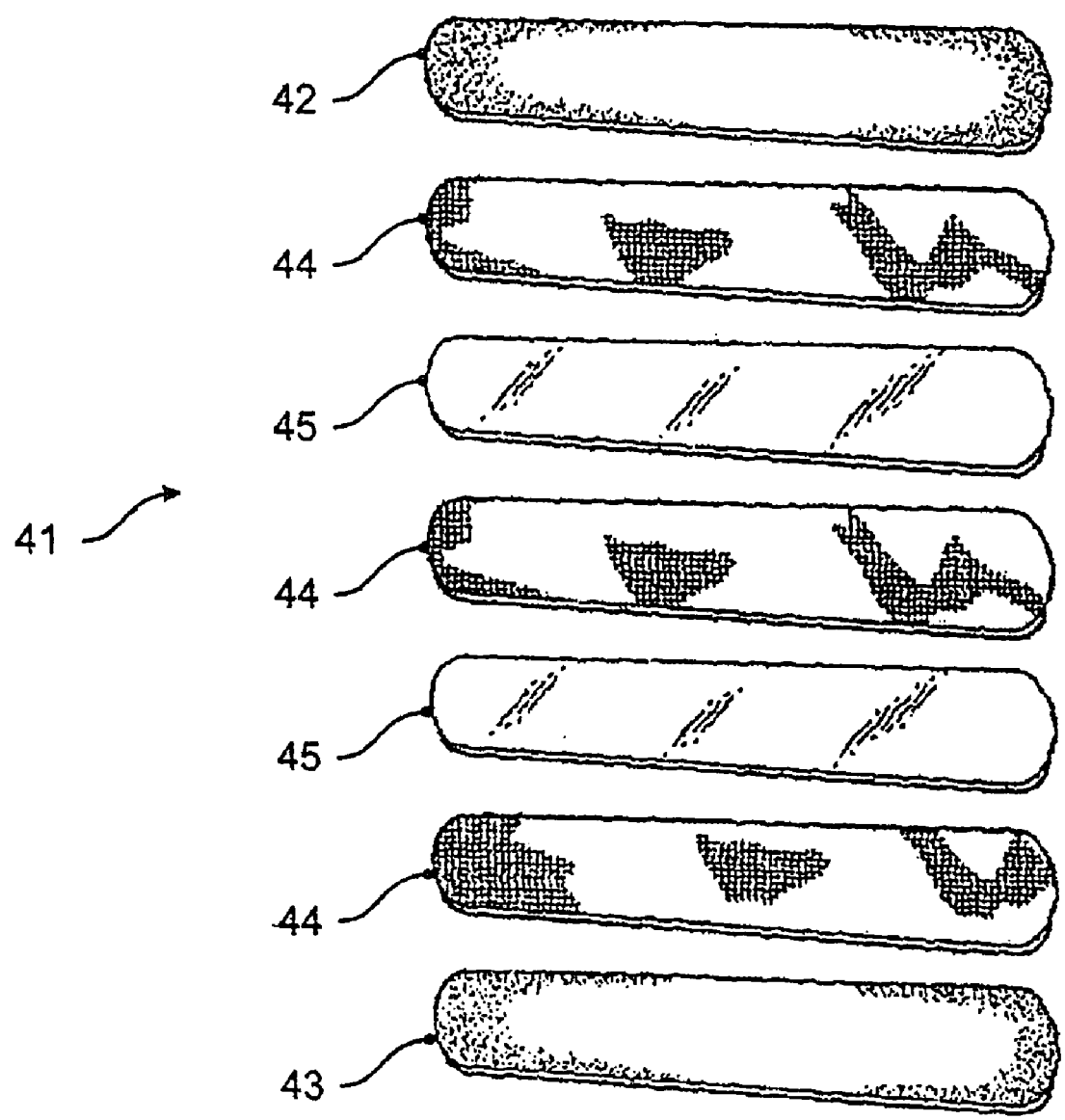
FIG. 3 shows an open, perspective view of a known hand pressure-device according to WO 99/27853.

As shown in FIG. 3, a known hand pressure-device according to WO 99/27853 encloses a capacitive sensor 41, mainly consisting of three pressure-sensitive, conductive plates 44 with two dielectric (isolating) layers 45 between them. At the upper side of said plates 44 and 45 is a protective upper layer 42, and at the under side a protective under layer 43. All layers are oblong and need to be integrated in the handgrip of racquets, clubs, bats etc. (not shown). According to the design, as more hand pressure is exercised on layers 42-45, the electrical capacity of layers 44 will change to new values, due to the decreased dielectric (isolation) value of the dielectrical layer 45. When the new capacity value is lower than a preset threshold, the user will be warned by an audible or visual signal, which is generated by other electronic components of the device (not shown here).

Figure 4:
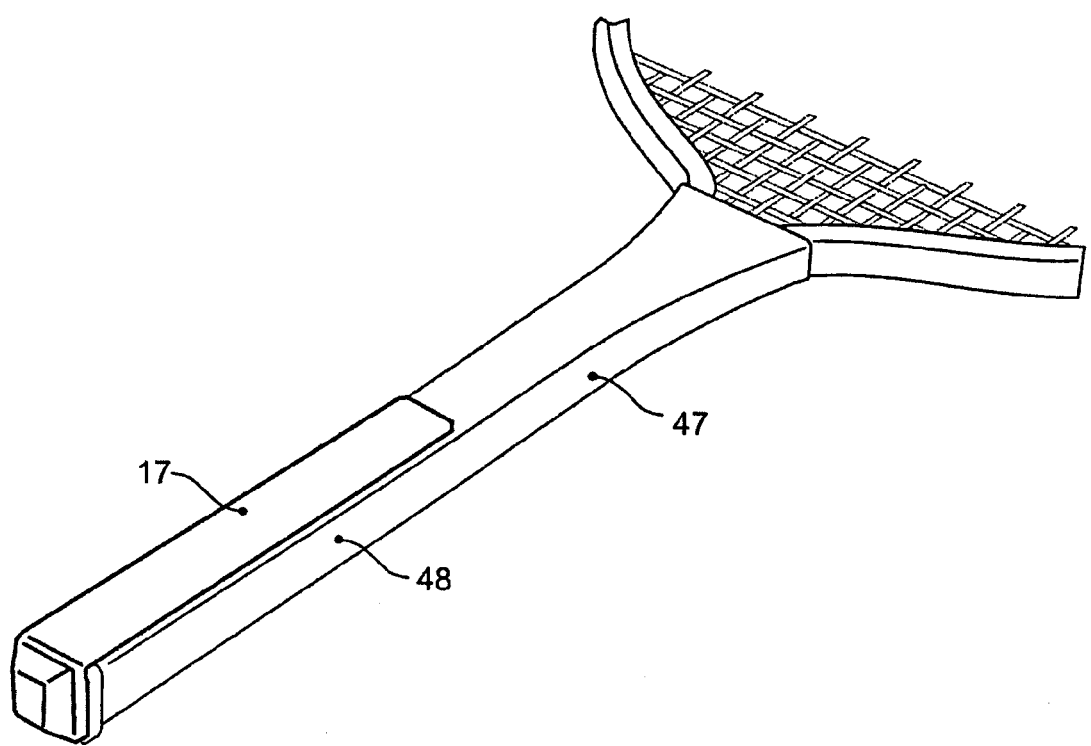
FIG. 4 shows perspective view of the ergonomic lightweight hand pressure sensor-warning device according to the invention (ergonomic lightweight hand pressure sensor-warning device)

The new ergonomic lightweight hand pressure sensor-warning device 17 according to invention is in a compact version, according to FIG. 4, mounted to a tennis racquet 47 at the location of the racquets' grip surface 48. Due to small dimensions of the hand pressure sensor-warning device 17 it is possible to put a hand pressure sensor-warning device 17 on all four sides, in a square cross-section, on the grip surface 48 of tennis racquet 47.

Figure 5:
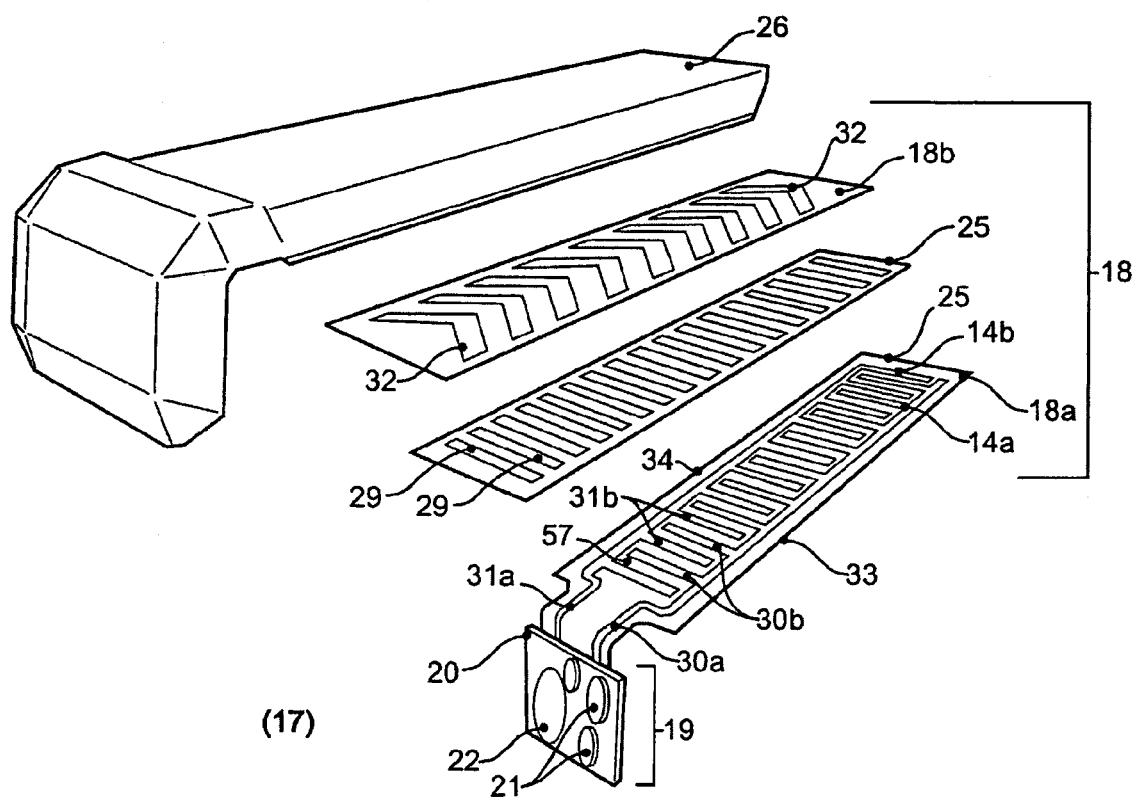
FIG. 5 shows an open, perspective view of the ergonomic lightweight hand pressure sensor warning device according to the invention.

The new hand pressure sensor warning device 17 according to FIG. 5, with dimensions approximately 20×140 mm, or ¾"×5⅜", comprises a membrane switch 18, being constructed from two flat membrane layers; a first layer 18a and a second layer 18b on top of the first layer; an electrical indicator 19, consisting of a circuit board 20 with power supply 21 and an integrated alarm device 22. An oblong housing element 26 covers all mentioned components into a compact unit, The first membrane layer 18a is provided with a first contact area 14a and a second contact area 14b. The first contact area 14a consists of interconnected strips 30a, 30b; second contact area 14b consists of interconnected strips 31a and 31b. The contact areas 14a/b are manufactured from an electric conducting material like copper, special metal products or carbon-conductive material or a combination thereof.

Membrane layers 18a and 18b are mutually positioned and fixed at parallel distance by means of a perforated isolating layer 25 having openings 29. This isolating layer 25 can be made of a thin sheet of foil, or it can be formed out of a glue layer. The openings 29 can have all sorts of shapes, but preferably the shape of openings correspond to the shape of the sides strips 30b and 31b of the contacts areas 14a and 14b of the first membrane layer 18a. The second membrane layer 18b has V-shaped contact areas 32 in this embodiment, but these areas can have all sorts of regular shapes. The electrical indicator 19 and the on the indicator attached alarm device 22 are attached to the first membrane layer 18a and interconnected to the first and second connecting strips 30a and 30b Both connecting strips 30a and 31a run parallel to the longitudinal edges 33 and 34 in the direction of the end edge 35 of the first membrane layer 18a. The connecting strips 30a respectively 31a both have parallel running side strips 30b respectively 31b which extend widthwise from a connecting strip 30a respectively 30b in the direction of the opposite longitudinal edges 34 respectively 33. The two contact areas 14a and 14b do not connect on the membrane layer 18a thus creating an open electrical circuit. When a finger presses against the housing element 26 first membrane layer 18b is pressed against isolating layer 25 and when the finger or hand pressure exceeds the threshold value contact area 32 is pressed through the isolating layer 25 and its openings 29 onto contact areas 14a and 14b thus closing the electrical circuit and activating the alarm device 22.

Figure 6:
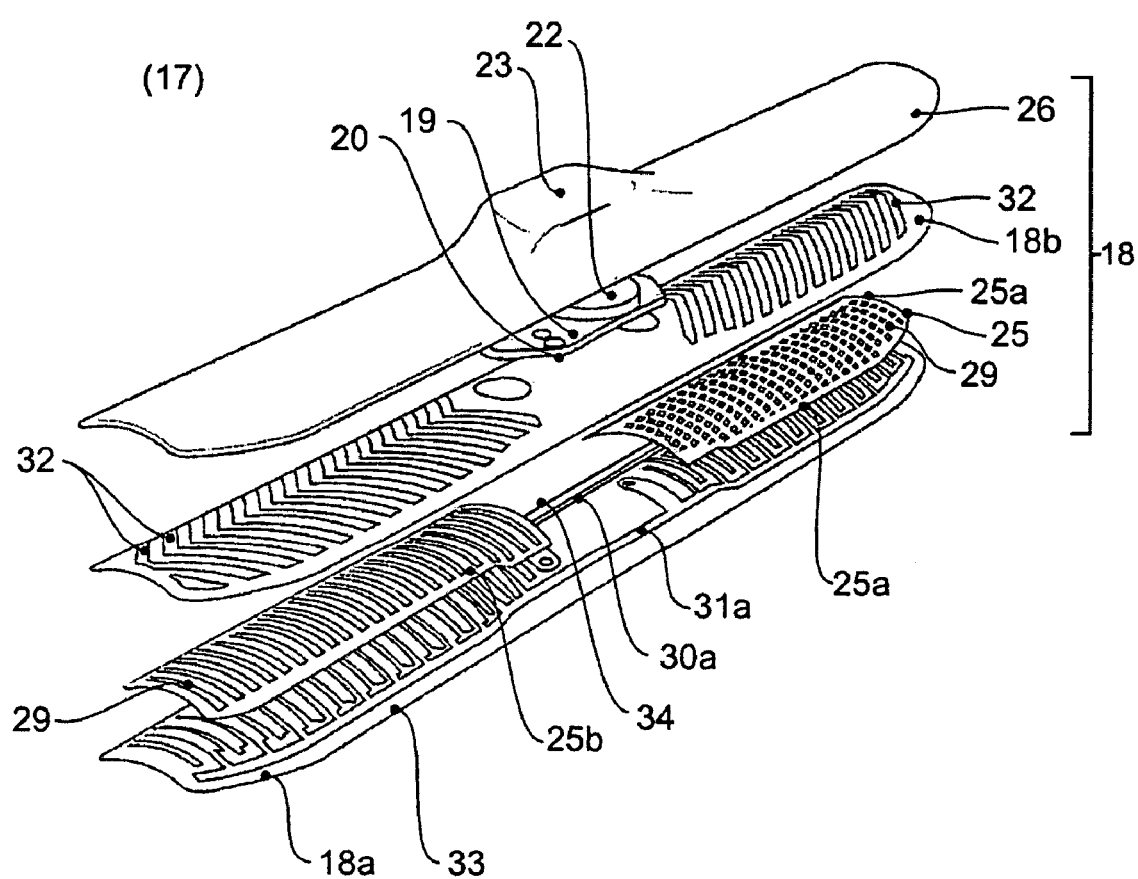
FIG. 6 shows an exploded, perspective view of an alternative embodiment of the hand pressure sensor device according to the invention.

According to FIG. 6, the membrane switch 18 in an alternative embodiment comprises first membrane layer 18a, second membrane layer 18b and isolating layer 25. Electrical indicator 19 is attached in the middle of the first membrane layer 18a. The contact areas 14a and 14b are situated on both ends of the first membrane layer 18a. The first connecting strip 30a runs parallel to the first longitudinal edge 33, the second connecting strip 31a runs parallel to the second longitudinal edge 34. The parallel running side strips 30b and 31b are interrupted at the location where the electrical indicator 19 is attached.

Figure 7:
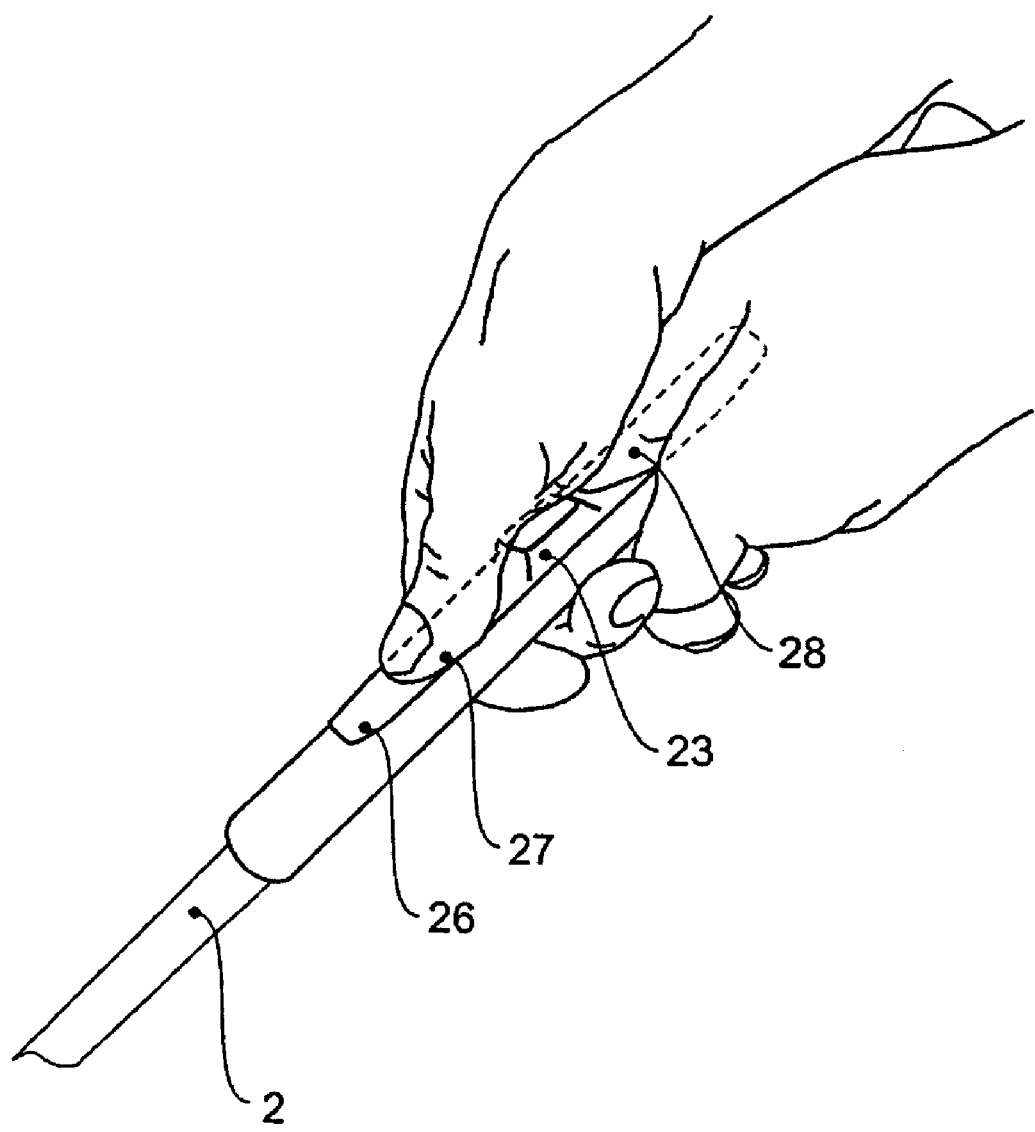
FIG. 7 shows a perspective view of the hand pressure sensor device according to the invention, installed on a golf club.

Perforated isolating layer 25 is not formed out of one sheet or glue layer. On one side the isolating layer is constructed as a perforated glue-layer 25a with a lot of small openings 29; on the other side the isolating layer is constructed as a glue-layer 25b, consisting of parallel or non-parallel glue tracks. In this construction, the pressure sensitivity and the pressure threshold value of the membrane switches 18 are determined by the thickness of the side strips 30b and 31b; the mutual distance between the side strips 31b and 31b; the size and shape of the openings 29 of the isolating layer 25 and the mutual distance between the openings 29; the thickness and elasticity of the isolating layer 25 and the size and the shape and mutual distance of the contact areas 32 of the second membrane layer. The isolating layer 25 can have a constant thickness and material composition, but the thickness and the material composition can also change e.g. linear over the length or width or both of the membrane layer when a difference in elasticity of the isolating layer and/or in pressure sensitivity of the membrane switch is needed dependent on the position on the surface where the finger or hand pressure is exerted. Hereby, first membrane layer 18a has on its underside an adhesive strip (not shown) in order to attach the device to the outside of the grip of a e.g. a sports device as can be seen in FIG. 7. Membrane layers 18a, 18b, electrical indicator 19 with power supply (not shown) and integrated alarm device 22 are covered by the oblong and streamlined housing element 26 into a compact unity. The housing element 26 has a bulge 23, extending outward of a size big enough to receive and cover the indicator 19 and attached alarm device 22. In this embodiment the housing element 26 is bend widthwise perpendicular to its longitudinal axis as can be seen in FIG. 6. to fit easily on a sport etc. device with a circular cross-section as e.g. a rounded handgrip of a golf club as can be seen in FIG. 7.

According to FIG. 7, the new hand pressure sensor-warning device 17 of FIG. 6 is attached on a golf club. Thumbs 27, 28 of the golf player are positioned on that part of the housing element which is in close contact with the thin membrane layers of membrane switch, whereby indicator with power supply (not shown) and integrated sound device (not shown) is located between the thumbs 27, 28 in a bulge 23 formed in the housing cover 26. When the finger pressure on the golf club exceeds the threshold value the membrane switch closes and a alarm signal will be given to the golf player.

Figure 8:
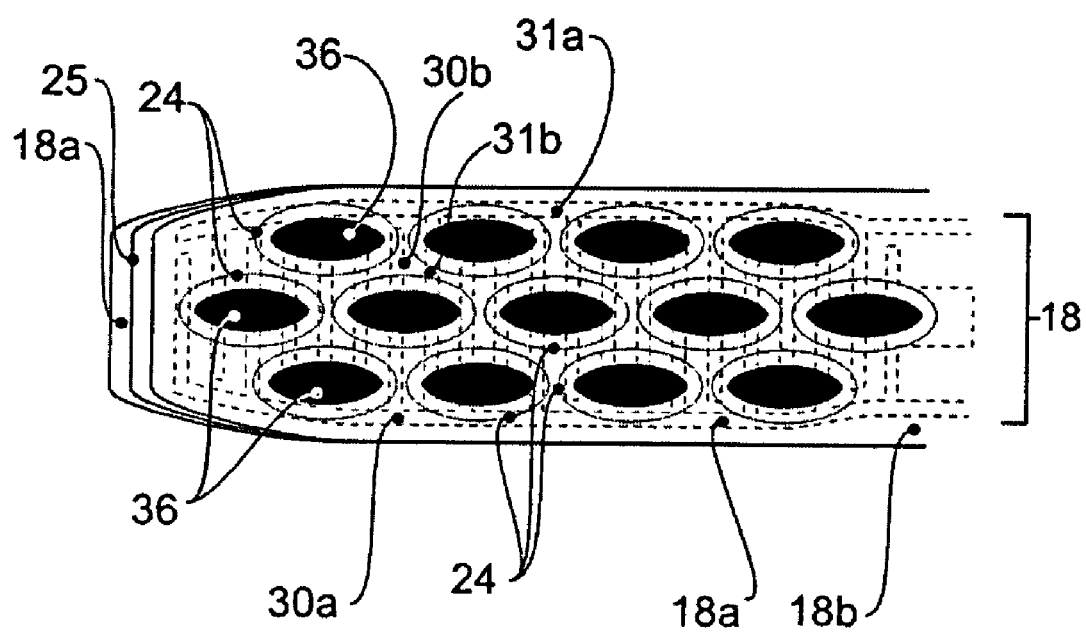
FIG. 8 shows an enlarged detail of an alternative embodiment of the membrane switch according to the invention.
Figure 9:
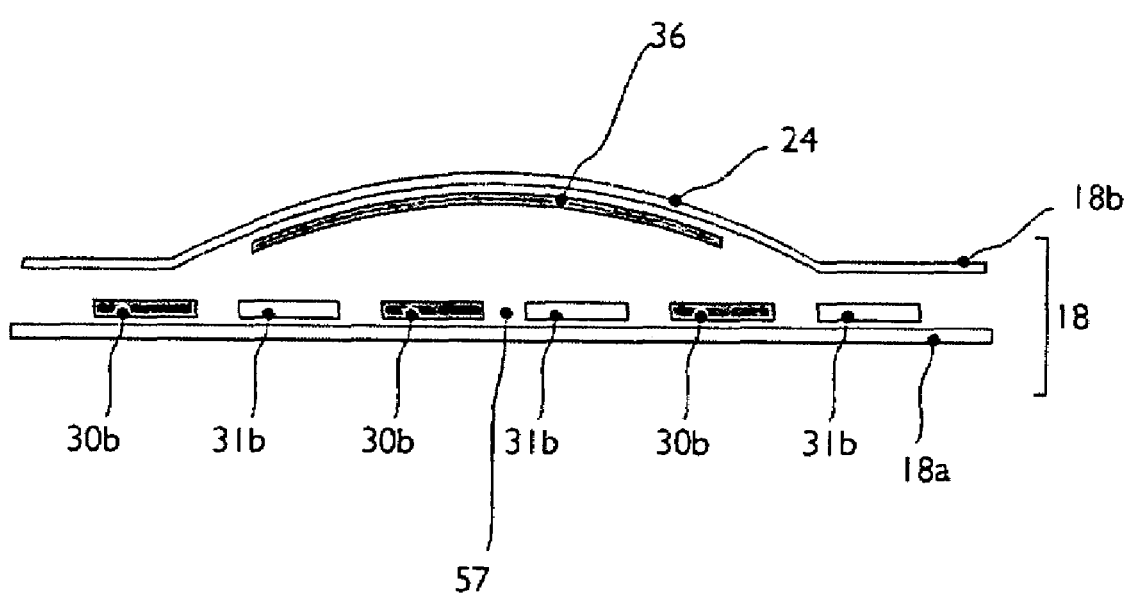
FIG. 9 shows a cross-sectional view of the membrane switch with the second membrane layer with domes.
Figure 10:
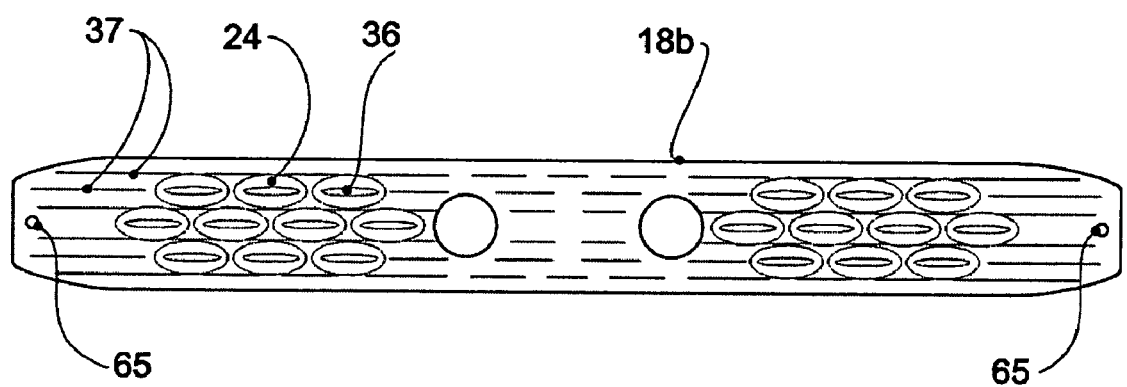
FIG. 10 shows a detail of an alternative embodiment of the second membrane layer.

In another embodiment which can be seen in FIGS. 8,9 and 10, the oblong thin second membrane layer 18b of membrane switch 18 is of a different construction with plastic or metal domes 24 in such a manner that the hand pressure sensitivity as well as the hand pressure threshold value, is defined by the number, size and rigidity of said domes. The first membrane layer 18a also includes an adhesive strip in order to attach the warning device on the outside of a golf club's grip. In FIG. 8 can be seen that the membrane switch 18 comprises a first membrane layer 18a with contacting areas 14a and 14b consisting of connecting strips 30a, 30b, 31a, 31b, and a second membrane layer 18b which is provided with a pattern of domes 24 formed from the membrane layer with on the inside of the domes contact areas 36. As can be seen in FIG. 8 the domes 24 are positioned in such a way that parallel running side strips 30b and 31b can be connected by contact areas 36 when hand or finger pressure is exerted on the domes 24. The hand pressure sensitivity as well as hand pressure threshold value is defined by the number, size and rigidity of said domes 24. The side strips 30b and 31b are separated by openings 57, creating regular mutual distance between two adjacent side strips. A contact between the conductive adjacent side strips 30b and 31b is realized when at least one of the domes 24 with its contact area 36 is sufficiently deformed to make a simultaneous contact with the conductive side strips 30b and 31b, by hand pressure forces, exercised by the fingers (not shown here) of a user, driver etc. In FIG. 9 shows a cross-section of the membrane switch 18 with first membrane layer 18a comprising the side strips 30b and 31b of both contact areas at mutual distance 57. The isolating layer 25 is positioned between the first 18a and the second 18b membrane layer and preferably has a perforation pattern corresponding to the dome pattern on the second membrane layer 18b. The second membrane layer 18b has an outward extending dome 24 with contact area 36 on its inner surface. When the dome 24 is deformed by hand or finger pressure the contact area 36 will make a contact between two or more side strips 30b and 31b; thus closing the electrical circuit so the indicator 19 will generate an alarm signal.

In FIG. 10 an alternative embodiment of second membrane layer 18a is shown. The second membrane layer 18b is provided with domes 24 comprising conductive contact areas 36 on the inner surfaces. The second membrane layer 18b further comprises cuts or grooves 37 which extend longitudinally over the membrane layer 18b thereby facilitating bending widthwise of the membrane switch 18 perpendicular to its longitudinal axis for easy fit on a sport device 2 with a circular cross-section, as can be seen in FIG.

Figure 11:
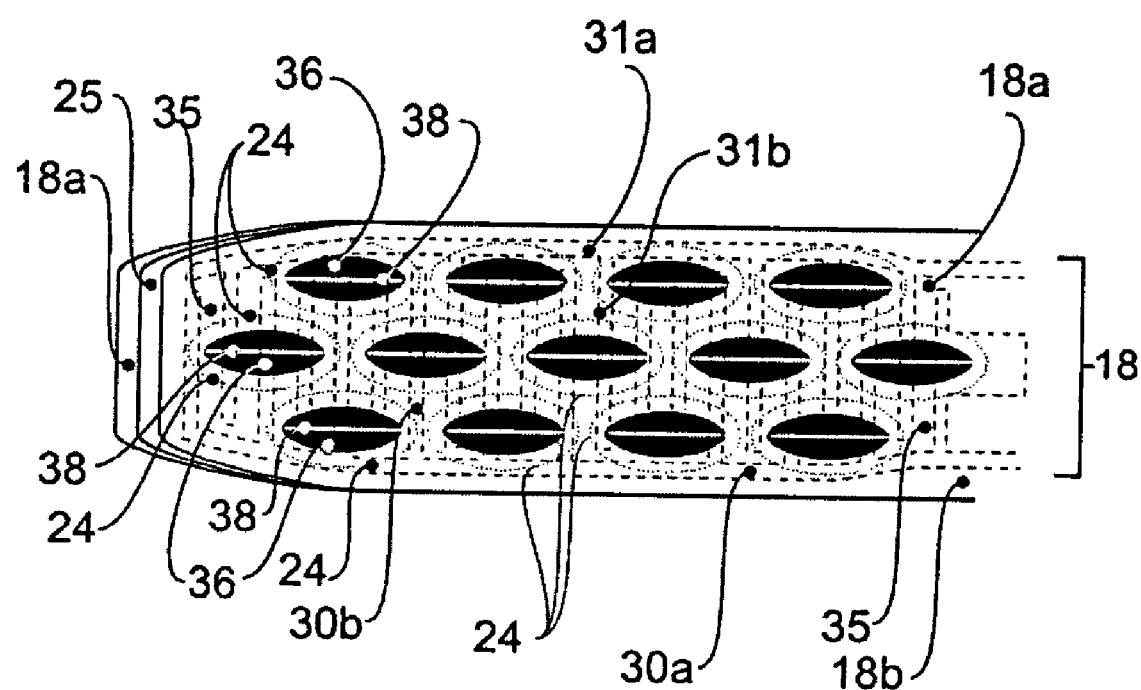
FIG. 11 shows an enlarged detail of an alternative embodiment of the membrane switch with cuts in the domes of the second membrane layer.

7. In FIG. 11 an alternative embodiment of the membrane switch 18 of FIG. 8 is shown. The domes 24 are provided with cut patterns or other incisions 38 to increase flexibility of the domes 24, making these domes easier to deform and thus increasing the pressure sensibility and lowering the pressure threshold value.

Figure 12:
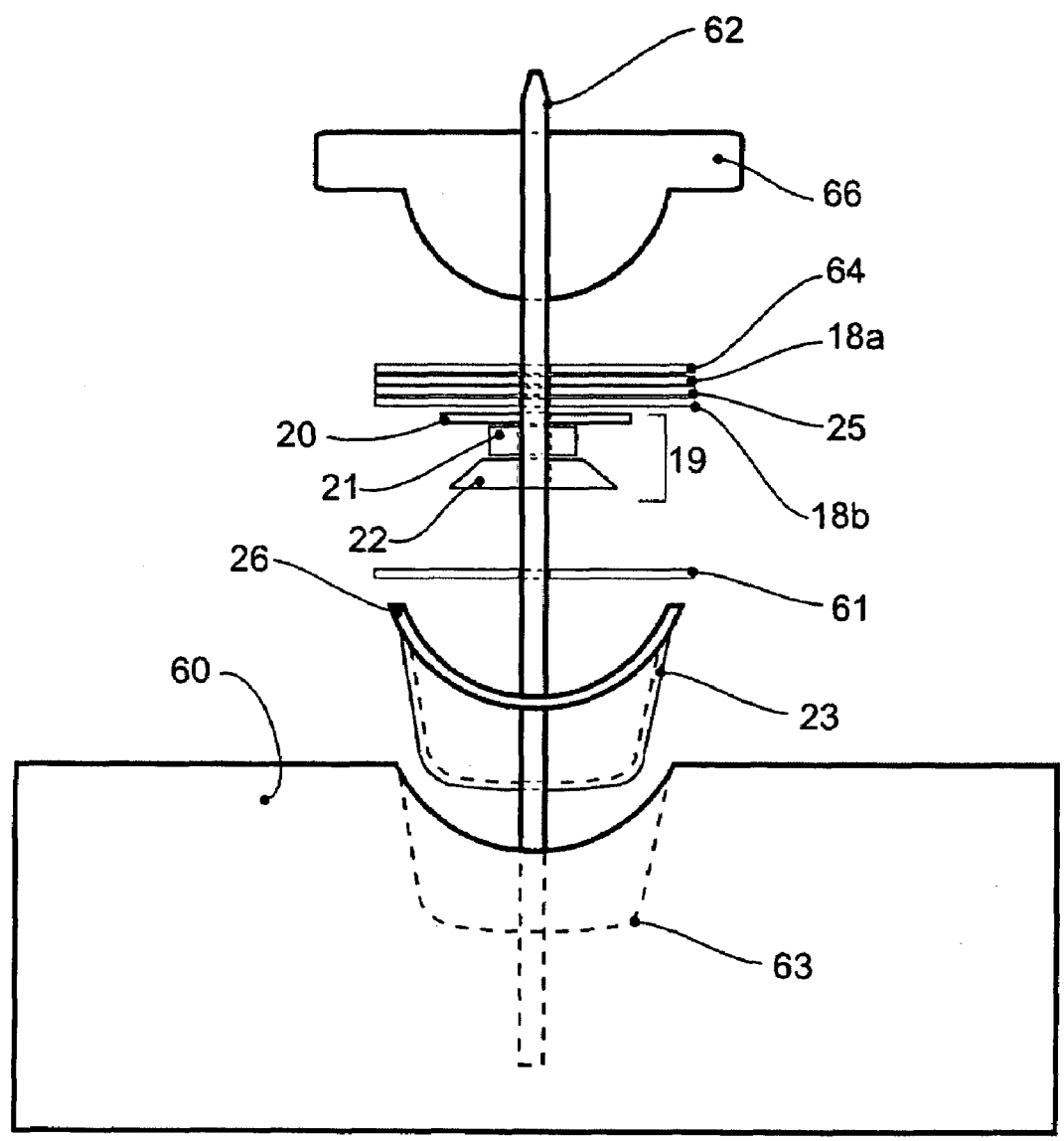
FIG. 12 shows a cross-sectional view of the assembling of the hand pressure sensor device by using a holder and a press means.

The second membrane layer 18b and the domes can have a constant thickness and material composition, but the thickness and the material composition can also change e.g. linear over the length of the membrane layer and/or over the domes when a difference in elasticity of the second membrane layer and of the domes, and/or in pressure sensitivity of the membrane switch, is needed dependent on the position on the surface where the finger or hand pressure is exerted. In FIG. 12 is shown how the hand pressure sensor warning device is assembled.

During assembling of the warning device a holder is used to make the assembling easier and cheaper. The hand pressure sensor warning device is assembled with the aid of a assembly holder 60 provided with pins 62. The holder 60 has a recess 63 of the same shape as the housing element 26. First the housing element 26 is placed and positioned in the holder upside down by pushing the housing element with the two assembly openings 65 over the pins 62. The assembly openings 65 can be seen in second membrane layer 18b in FIG. 10. The housing element 26 and the first membrane layer 18a are also provided with corresponding assembly openings for easy positioning (not shown). Then an attachment layer 61 is added for attachment of the already assembled membrane switch 18 with indicator 19 and adhesive strip 64. The membrane switch with indicator and adhesive strip is pressed into the housing element with circular cross-section by pushing the assembly openings 65 over the pins 62 of the holder 60 with press means 66. For easy bending of the membrane switch the second membrane layer 18b can be provided with cuts or grooves 37 as shown in FIG. 10. The assembled warning device is removed from the holder 60 first by removing the press means 66, secondly by pulling the assembled warning device from the pins 62.

Figure 13:
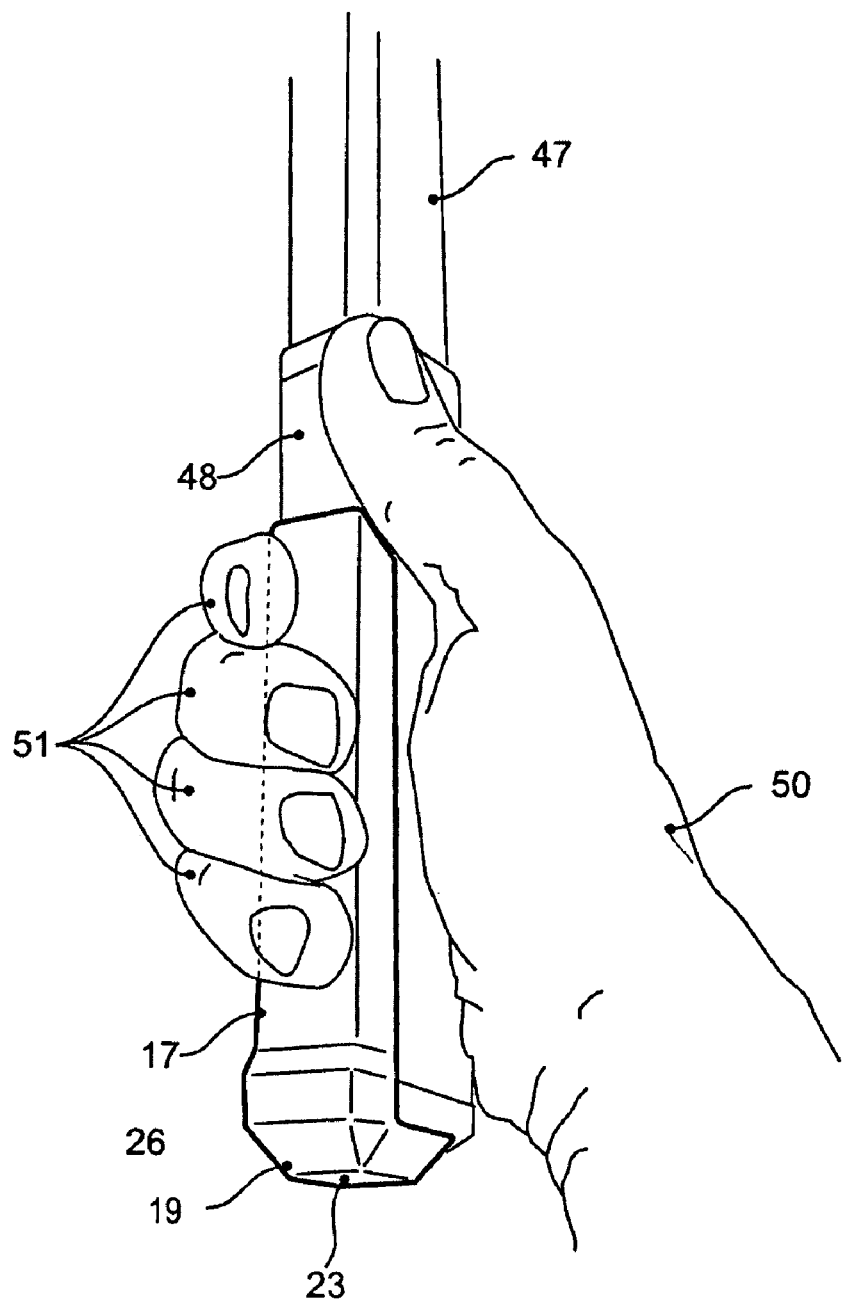
FIG. 13 shows a view of the ergonomic lightweight hand pressure sensor-warning device according to the invention during use.

According to FIG. 13 the new hand pressure sensor-warning device 17 is mounted to the handgrip part of a tennis racquet 47 and is enclosed by the fingers 51 of hand 50 of a tennis player. When the handgrip forces, exercised by fingers 51 on grip surface 48 of tennis racquet 47 exceed the hand pressure sensor-warning device 17 preset upper threshold, an audible warning is emitted by the electrical indicator 19 enclosed in the bulge 23 formed in the streamlined housing element 26.

Figure 14:
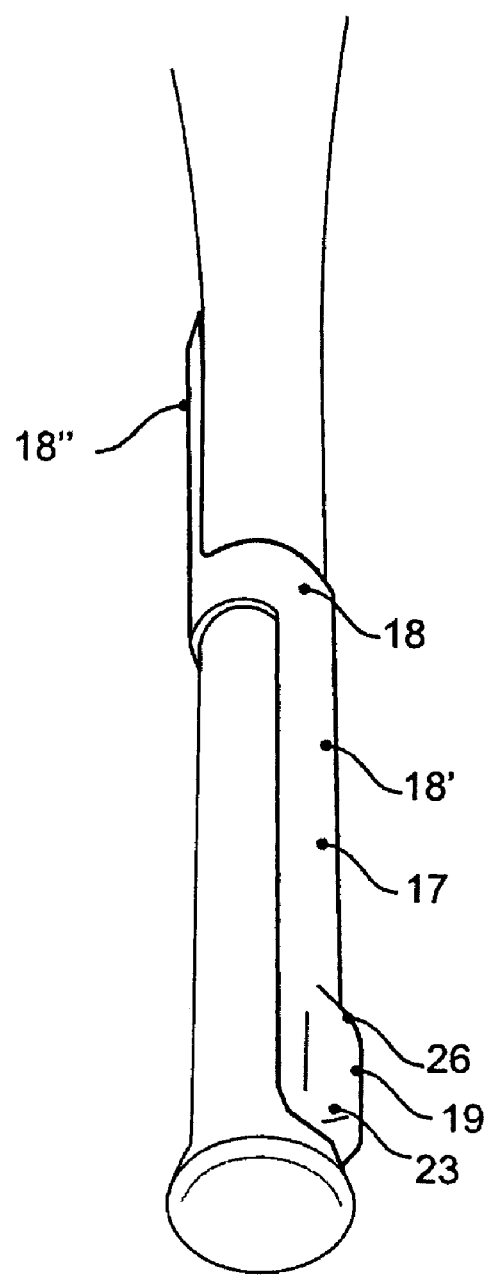
FIG. 14 shows a view of another embodiment of the ergonomic lightweight hand pressure sensor-warning device according to the invention.

An alternative embodiment of the compact ergonomic lightweight hand pressure sensor-warning device 17 is according to FIG. 14, 15, 16 mounted to the grip surface 48 of a baseball bat 49. Since a baseball player has a specific way of gripping the baseball bat, ('round and round'), the membrane switch 18 of this hand pressure sensor-warning device 17 has two parts. These are a first part 18' and a second part 18" which are interconnected. An electronic indicator 19 is enclosed in a bulge 23 of the streamlined housing element 26, being located close to the free (lower) ends of the grip surface 48 of baseball bat 49.

Figure 15:
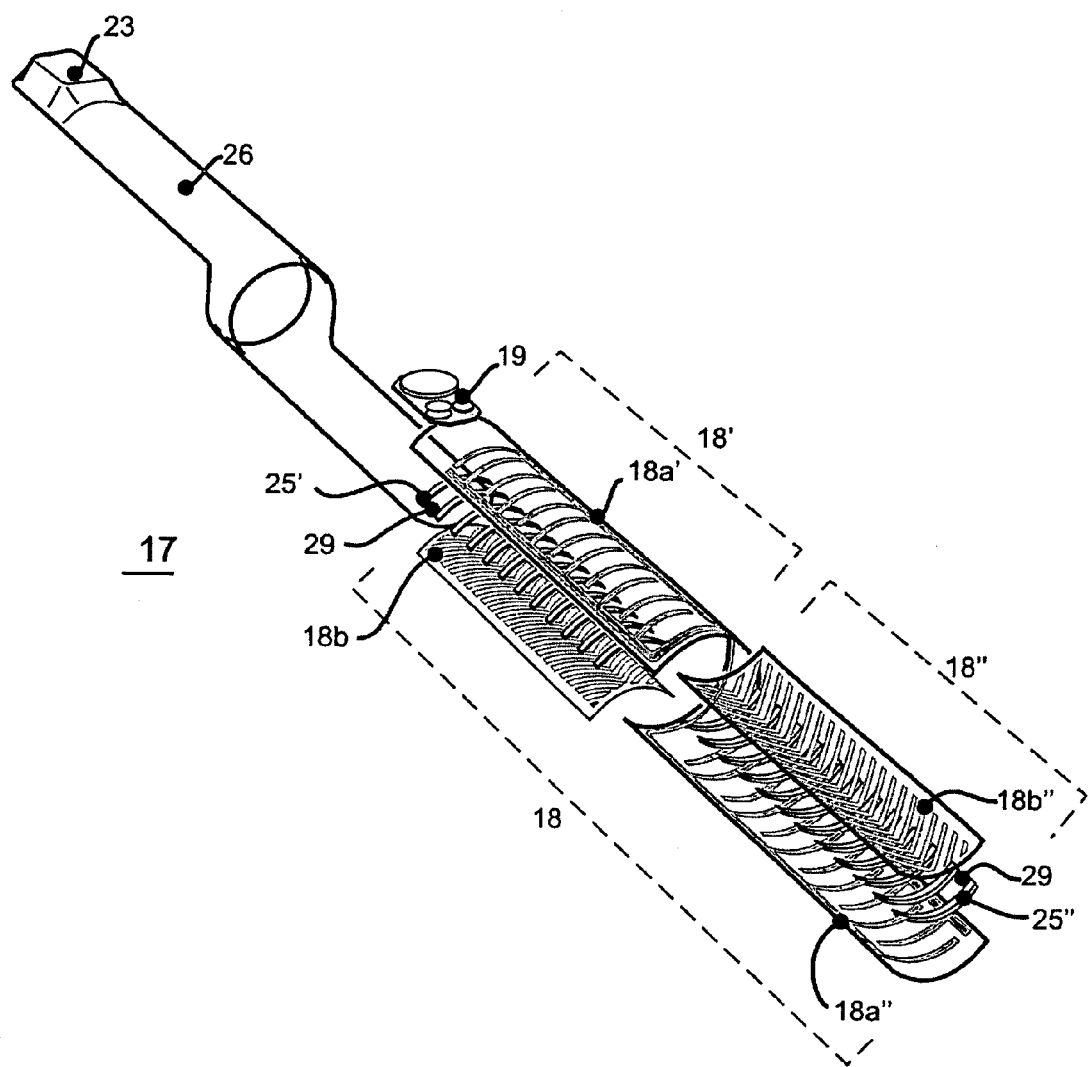
FIG. 15 shows an open, perspective view of an alternative embodiment of the ergonomic lightweight hand pressure sensor-warning device, as shown in FIG. 14.

In more detail the hand pressure sensor-warning device 17 is, as is shown in FIG. 15, constructed from membrane switch 18, electronic indicator 19 and the streamlined housing element 26. Membrane switch 18 consists of an first part 18', which consists of a first membrane layer 18a' and a second membrane layer 18b' and in between isolating layer 25', and a second part 18", which consists of a first membrane layer 18a" and a second membrane layer 18b" and in between with isolating layer 25". First and second membrane layers 18a', 18a", 18b', 18b" are provided with contact areas, manufactured from copper, special metal products or carbon-conductive material or a combination thereof. The isolating layers, 25' and 25" respectively, have oblong openings 29. In this embodiment the first membrane layers 18a' and 18a" are in direct contact with housing element 26 and the second membrane layers 18b' and 18b" are positioned on the inside of the warning device which is attached to the baseball bat 49. Membrane switch 18 is constructed out of 2 parts, but can also be constructed from one or more parts.

Figure 16:
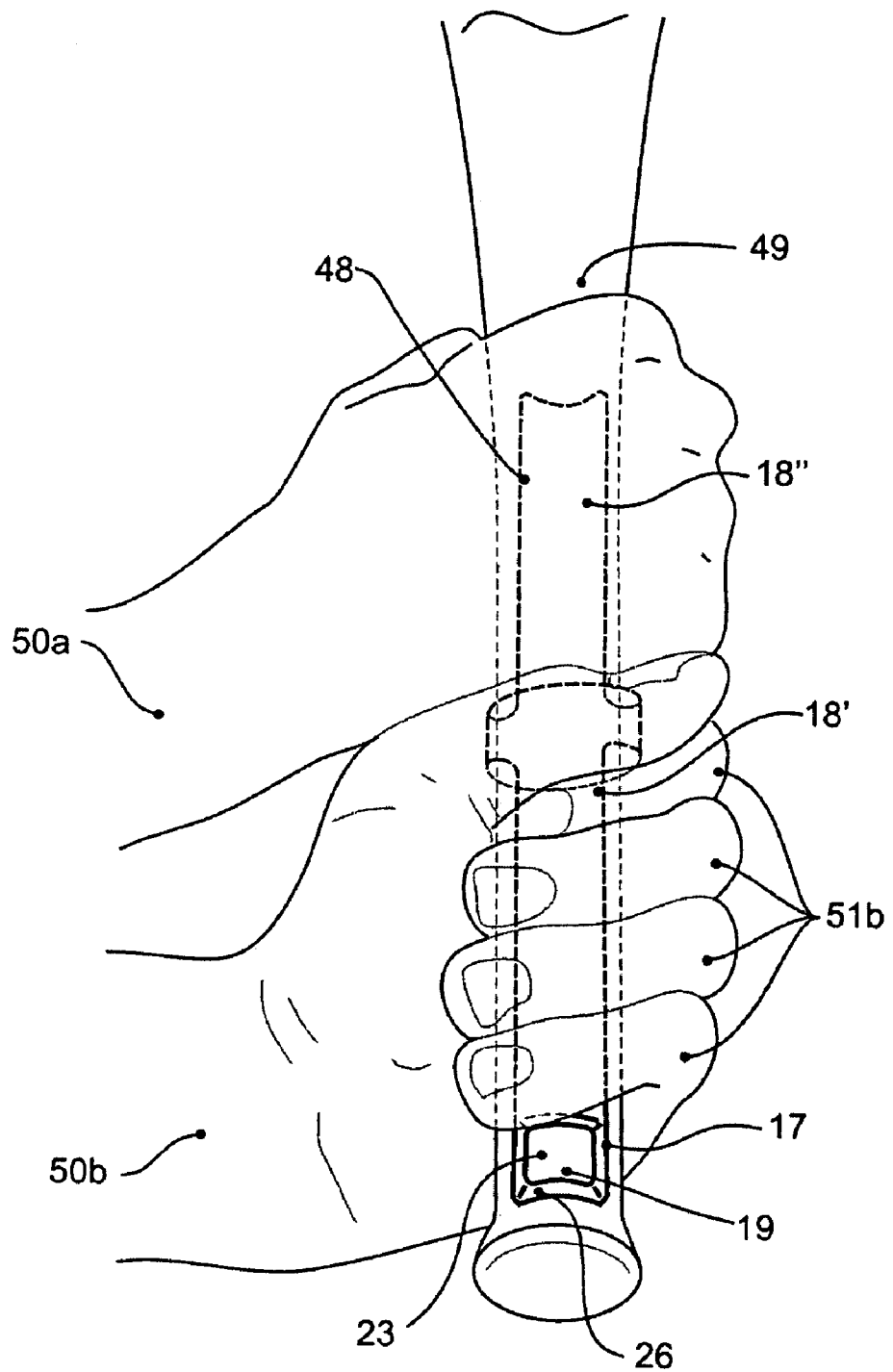
FIG. 16 shows a view of an alternative embodiment, as shown in FIG. 14 and FIG. 15, of the ergonomic lightweight hand pressure sensor-warning device according to the invention during use.

According to FIG. 16 the new hand pressure sensor warning device 17 is mounted to the handgrip area 48 of a baseball bat 49. During use the warning device is more or less enclosed by fingers 51a (not visible) respectively 51b from the right hand 50a respectively left hand 50b of a baseball player. When the handgrip forces, exercised by fingers 51a (not visible) from the upper right hand 20a and/or the fingers 51b from the lower left hand 50b (or vice-versa) on the grip surface 48 of a baseball bat 49 exceed the hand pressure sensor warning device 17 preset upper threshold, an alarm signal is generated by the electrical indicator 19 which is enclosed in a bulge 23 formed in the streamlined housing element 26.

Figure 17:
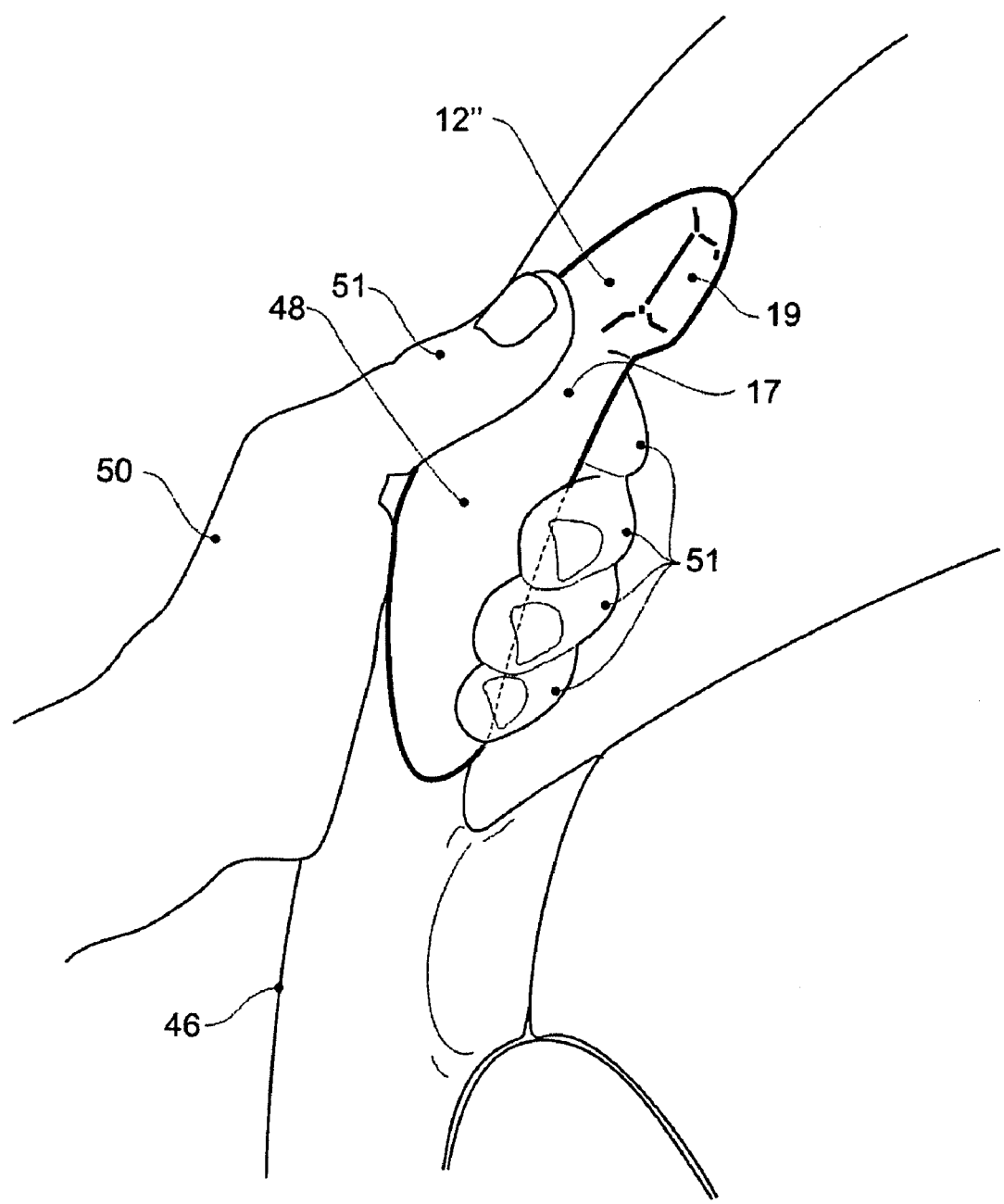
FIG. 17 shows a view of an alternative embodiment of the ergonomic lightweight hand pressure sensor-warning device according to the invention during use.

Another version of the compact ergonomic lightweight hand pressure sensor-warning device 17 is according to FIG. 17 mounted on a steering wheel 46 of a vehicle. When the handgrip forces, exercised by fingers 51 on grip surface 48 of a vehicle steering wheel 46, exceed the hand pressure sensor-warning device 17 preset upper or lower threshold, or zero pressure, an audible or visible alarm signal will be generated by the electrical indicator 19 to warn the vehicle driver.

Figure 18:
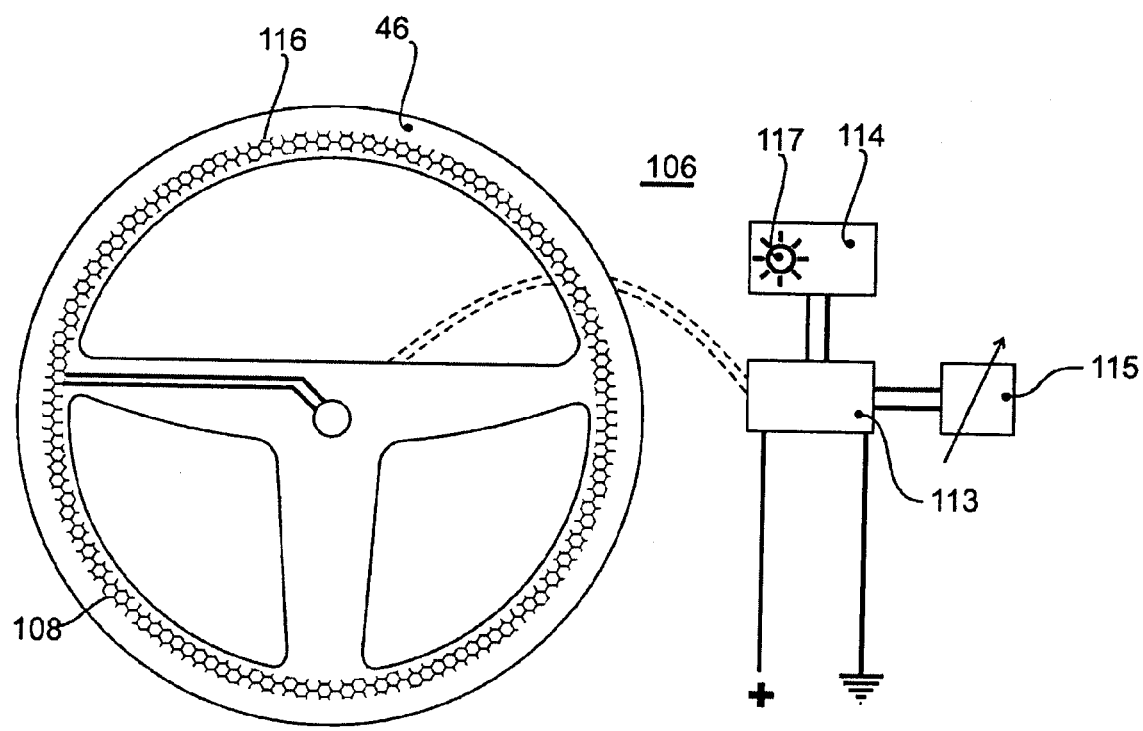
FIG. 18 shows schematically an alternative embodiment of the ergonomic lightweight hand pressure sensor-warning device according to the invention.

As shown in FIG. 18, another embodiment of a hand pressure sensor warning device 106 for use by vehicle operators comprises a rounded membrane switch 116, a signal processing unit 113 with an integrated calibration unit 115 and an indicator 114. The relatively thin rounded membrane switch 116 is attached to, or integrated within, the steering wheel 46 and interconnected to the signal processing unit 113 by means of wired connectors (shown as striped lines), through the steering column. The signal processing unit may be located within the dashboard of the vehicle. The adjustment of the right upper hand pressure threshold, depending on, for instance, the height of the driver, is realized by processing unit 113. The functional principles of such calibration units is well known and is not further elaborated here. When the handgrip forces exercised by the drivers hand or fingers (not shown here) on grip surface 108 of a vehicle steering wheel 46, exceed a preset upper or lower threshold of the calibration unit 115, or register zero pressure, an audible or visible alarm will be emitted to the vehicle driver by the electrical indicator 114. This alarm signal may be a combination of a visual alarm signal by means of a signal lamp or a LED 115 in the dashboard of the vehicle and an audible alarm.

Figure 19:
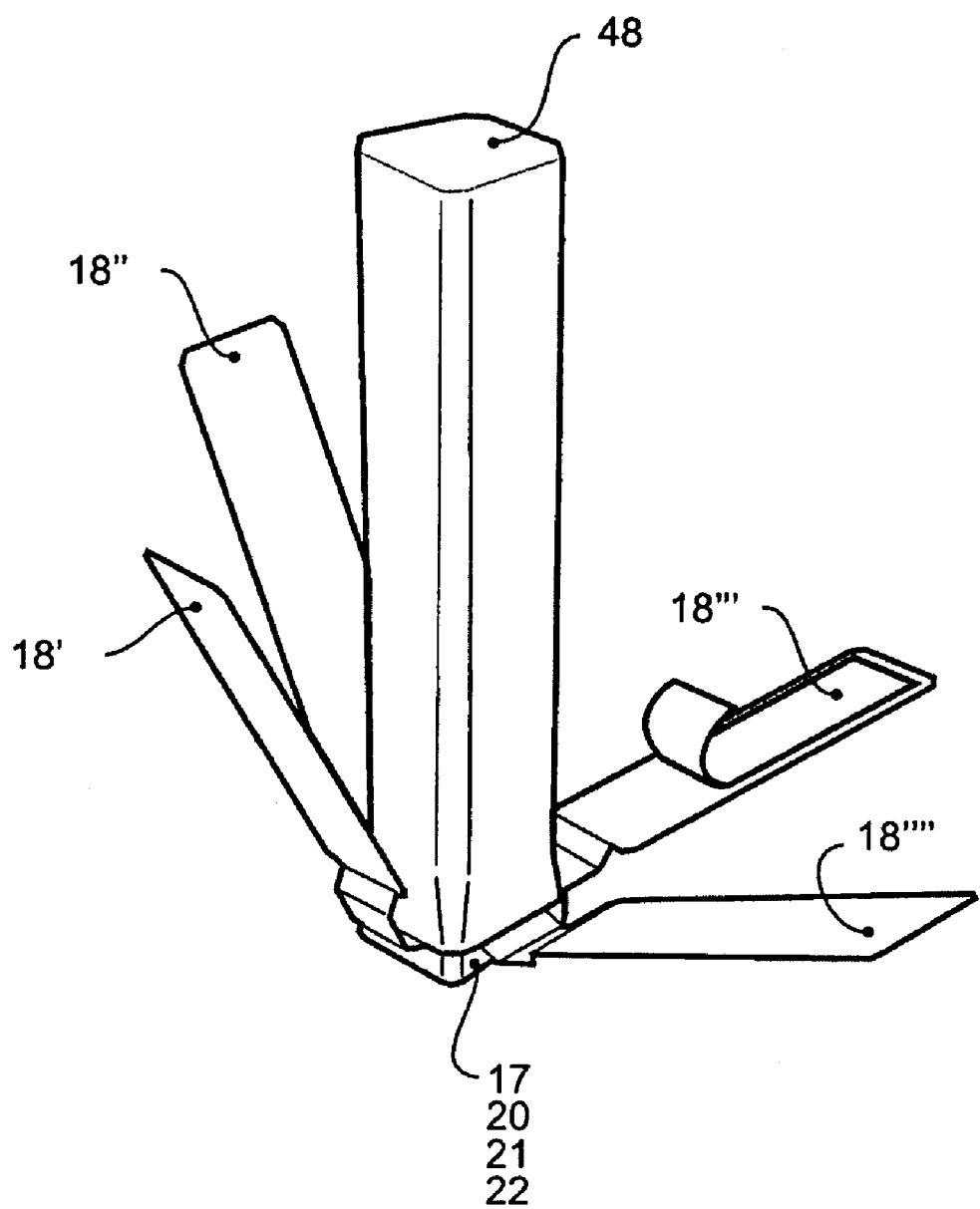
FIG. 19 shows a perspective view of an alternative embodiment of the ergonomic lightweight hand pressure sensor-warning device according to the invention.
Figure 20:
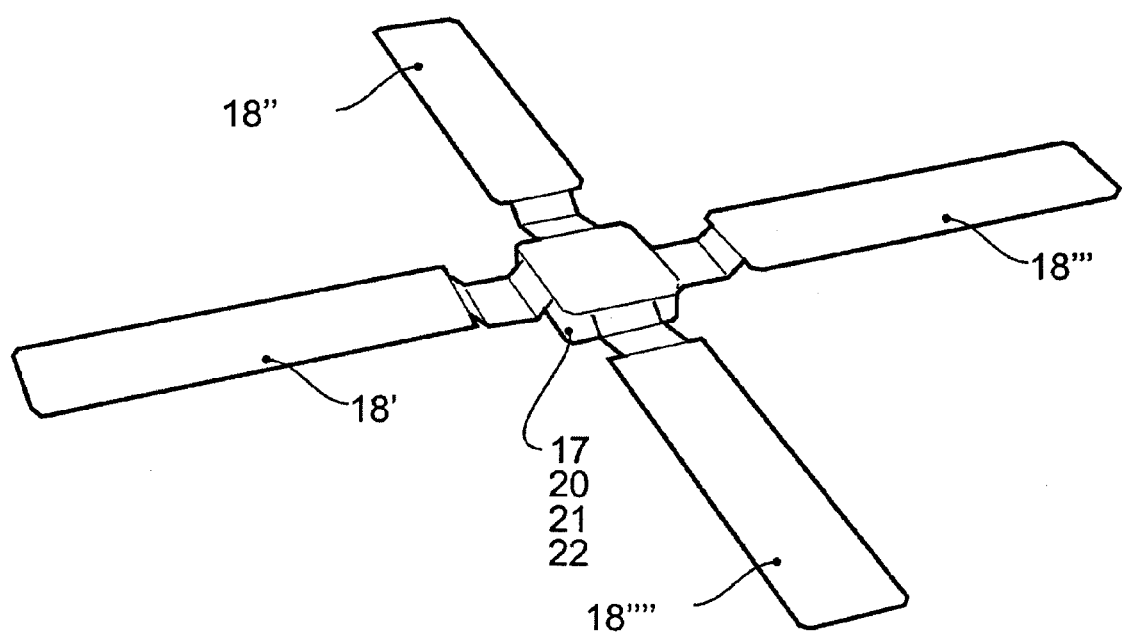
FIG. 20 shows a perspective view of a similar ergonomic lightweight hand pressure sensor-warning device according to the invention as shown in FIG. 19.

According to FIG. 19, another embodiment of the new hand pressure sensor-warning device 17 is mounted to hand grip 48 of, for example, a tennis racquet. This hand pressure sensor-warning device 17 consists of 4 membrane switch parts or units 18', 18", 18''', and 18'''', and an indicator 19, with an integrated circuit board 20, power supply 21 and an alarm signal device 22. A similar design version of the new hand pressure sensor-warning device 17 is shown in FIG. 20, without the specific hand grip (of a tennis racquet etc.). Each membrane switch can be connected to the same indicator, but each membrane switch can also be connected to its own indicator or any combination of switches and indicators can be applied when necessary.

Figure 21:
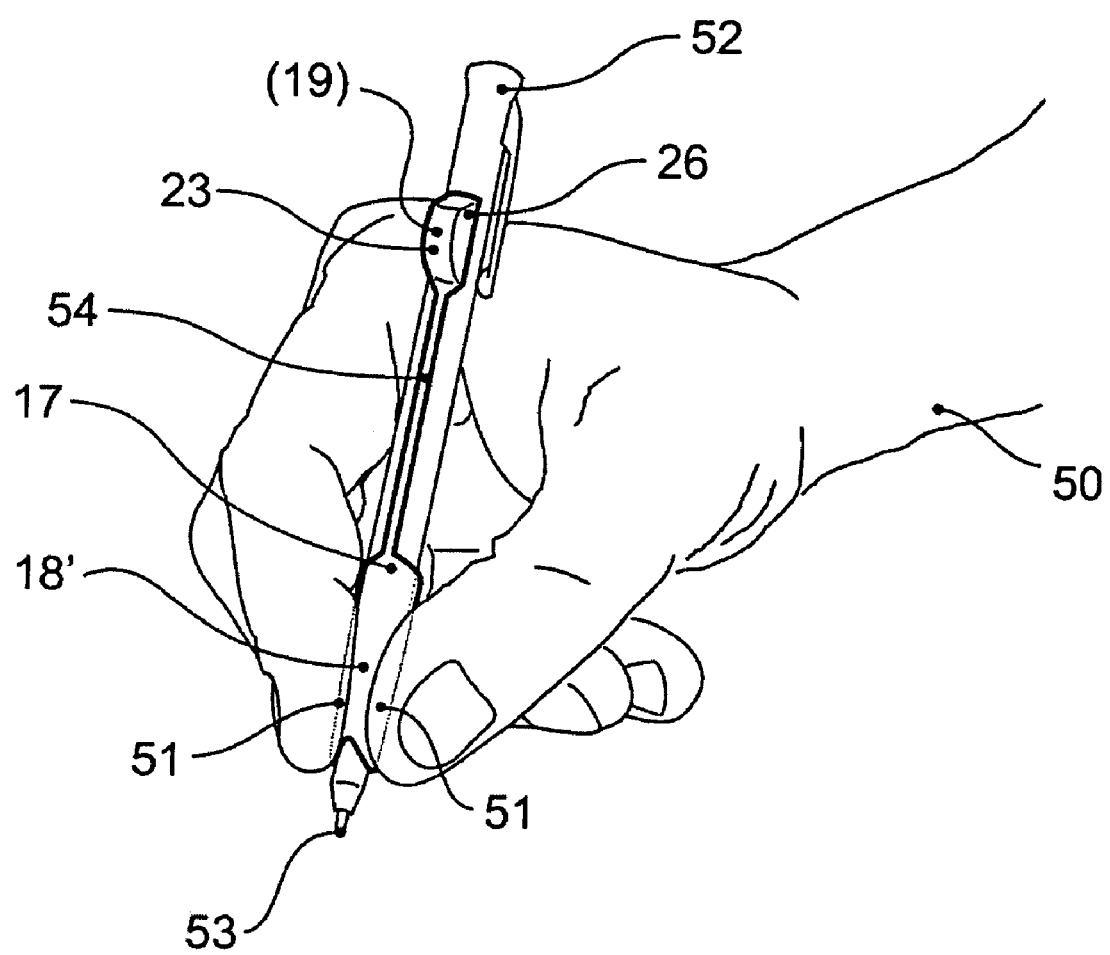
FIG. 21 shows another embodiment of the hand pressure sensor warning device attached to a pencil.

Another embodiment of the compact ergonomic lightweight hand pressure sensor-warning device 17 is according to FIG. 21 attached to a writing pen or pencil 52 with writing tip 53. When the finger grip forces, exercised by fingers 51 on grip surface of the membrane switch 18' of a writing pen or pencil 52, exceed the hand pressure sensor warning device 17 preset upper threshold, an audible or visible alarm will be generated by the electrical indicator 19 warning the writer. The electrical indicator is enclosed in the bulge 23 formed in the streamlined housing element 26, and connected to membrane switch 18' by integrated connector 54.

Figure 22:
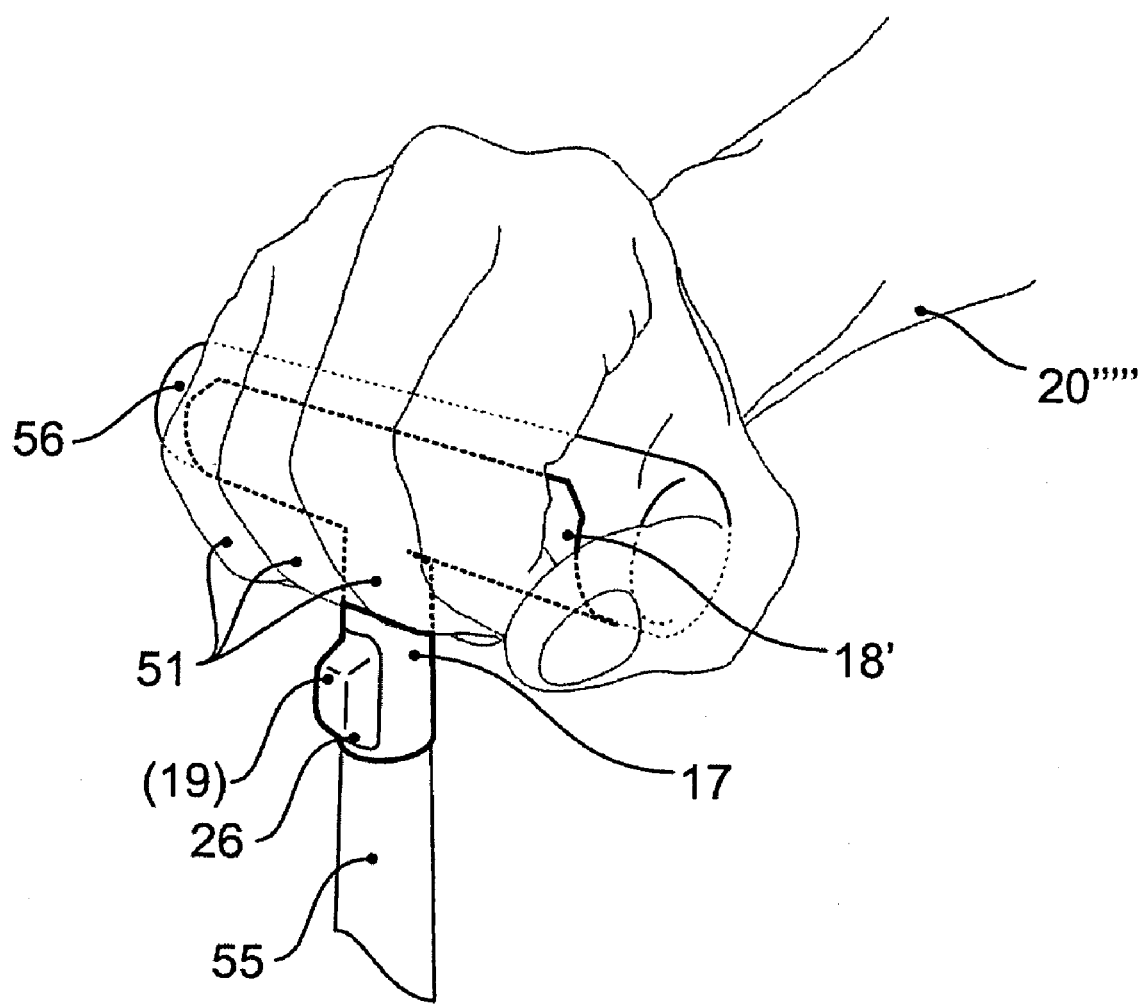
FIG. 22 shows another embodiment of the hand pressure warning device attached to a control handle of an industrial machine.

Another embodiment of the compact ergonomic lightweight hand pressure sensor-warning device 17 is according to FIG. 22 mounted to a control handle of an industrial machine, a helicopter or an aircraft 55 with grip handle 56. When the finger grip forces, exercised by fingers 51 on the sensitive membrane switch grip surface 18' attached to the control handle of an industrial machine, a helicopter or an aircraft 55, exceed the hand pressure sensor warning device 17' preset upper threshold, an audible or visible warning will be generated by the electrical indicator 19 to the vehicle driver. The electrical indicator 19 is enclosed in the bulge 23 formed in the streamlined housing element 26, and connected to sensitive membrane switch 18'.

The housing element 26 or a part of it can have a constant thickness and material composition, but the thickness and the material composition can also change e.g. linear or non linear over the length or width or both of the membrane layer when a difference in elasticity or stiffness of a housing element part and/or in pressure sensitivity of the warning device is needed dependent on the position on the surface. The housing element or a part of it can have weak spots for e.g. bending of the warning device on a handheld device created e.g. by grooves or cuts or changes in material thickness or composition.

It is noted that the embodiments of the hand pressure sensor warning device regarding described herein in detail for exemplary purposes is of course subject to many different variations in structure. Because many variations may be made within the scope of the inventive warning device, it is to be understood that the details herein are to interpret al illustrative and not in a limiting sense.

Another important aspect of the invention is that the alarming device (22) consists of a standard piezo buzzer component (22'), in combination with a buzzer cover 22". The piezo buzzer is available in the market in a thin version (0.2 mm), and high output. A disadvantage of these thin piezo buzzers is their great vulnerability. Therefore, mostly thicker (0.6 mm), low output versions of piezo buzzers are used.

The outward extending bulge 23, which could be provided with bulge openings 22''' for increasing the sound output volume, on the oblong housing element 26, has a size big enough to receive and cover the indicator 19 and attached alarm device 22, but should be minimalized in dimensions in order to prevent infringement of the user's natural grip. Consequence is that only extremely small buzzers can be used which produce minimal sound levels.

In order to gain enough audible sound from the buzzer, buzzer covers are used to increase sound level from standard buzzers. The buzzer covers create a small 'loudspeaker' housing around the piezo buzzer and have physical holes to let soundwaves come outside. These buzzer covers exist in a great variety of existing standard components, made from plastics or metal. Normally, the metal covers produce more output with clearer and higher pitch.

Figure 23:
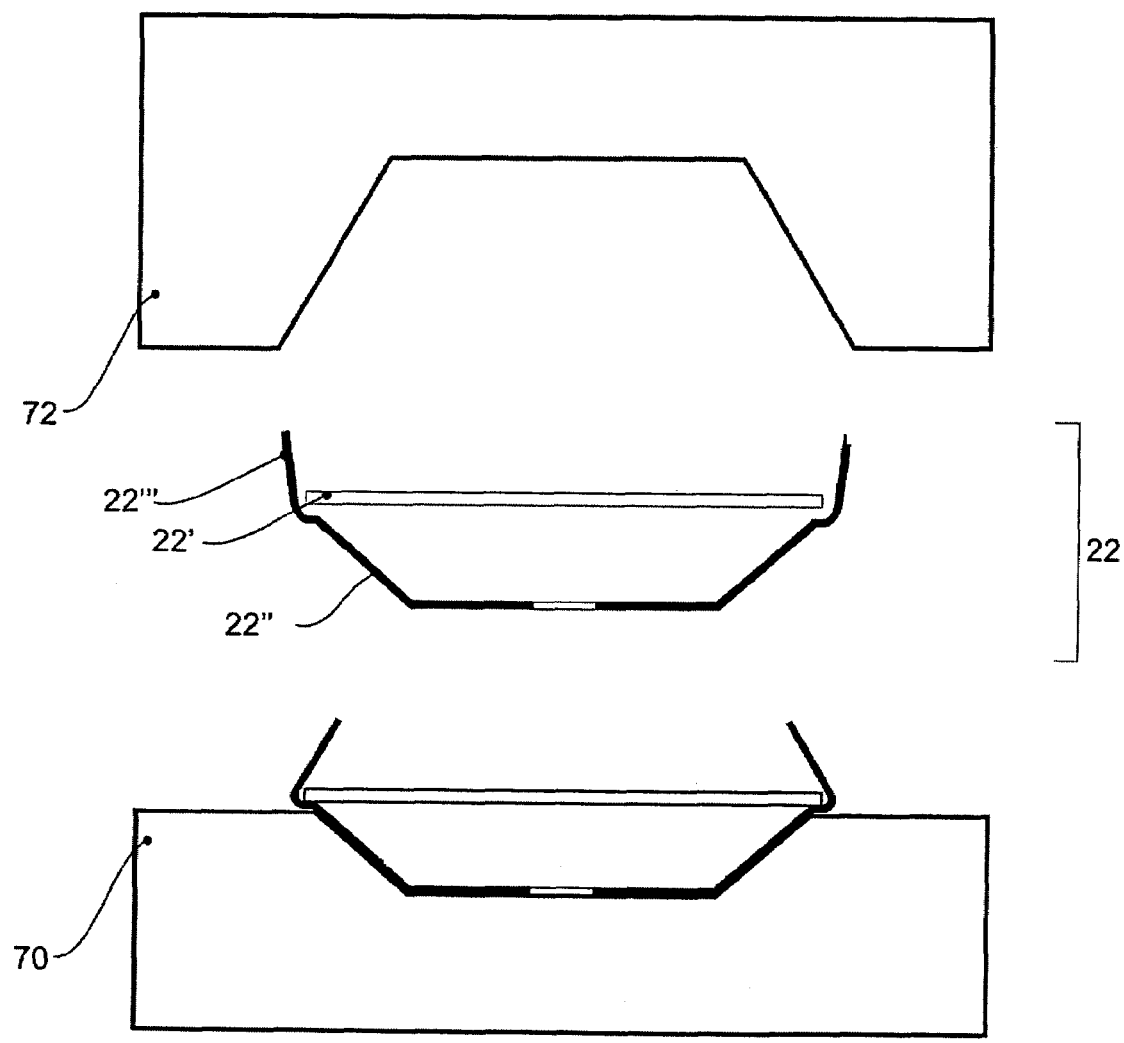
FIG. 23 schematically shows another embodiment of the invention as an alarming device together with an assembly holder in its open position.

To assemble metal buzzer cover 22" to the buzzer 22, normally an assembly holder (70) in FIG. 23 is used to fit and position the metal buzzer cover 22", while buzzer 22' is positioned in the metal buzzer cover 22".

Figure 24:
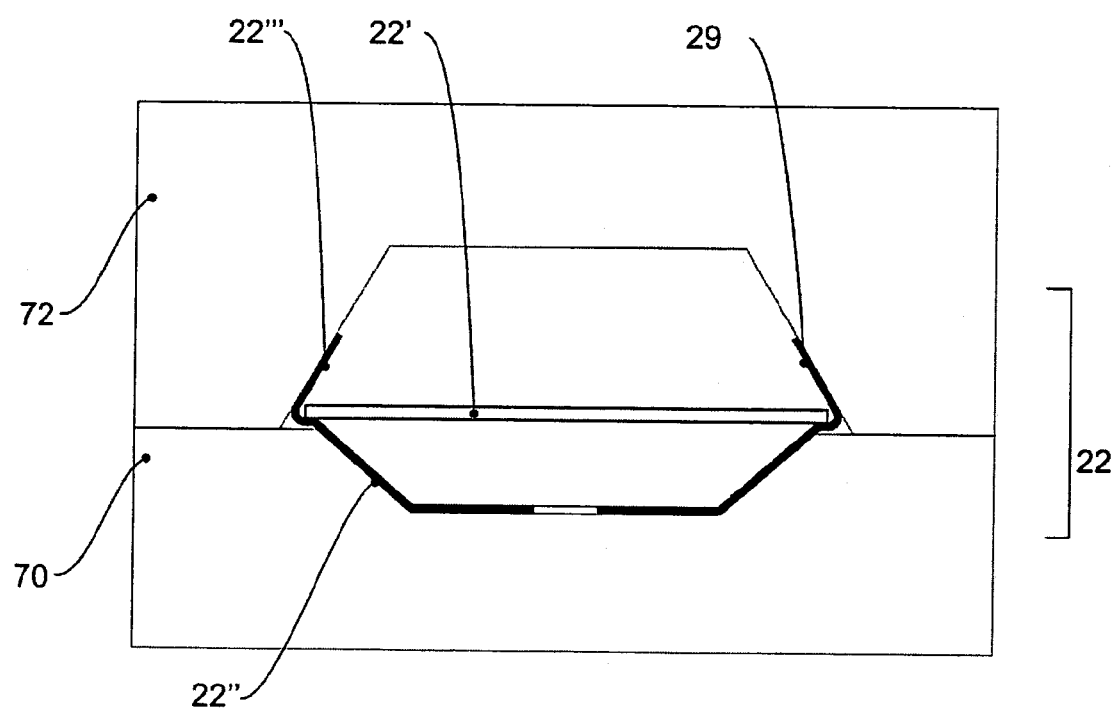
FIG. 24 shows the alarming device of FIG. 23 in the closed position within the assembly holder.
Figure 25:
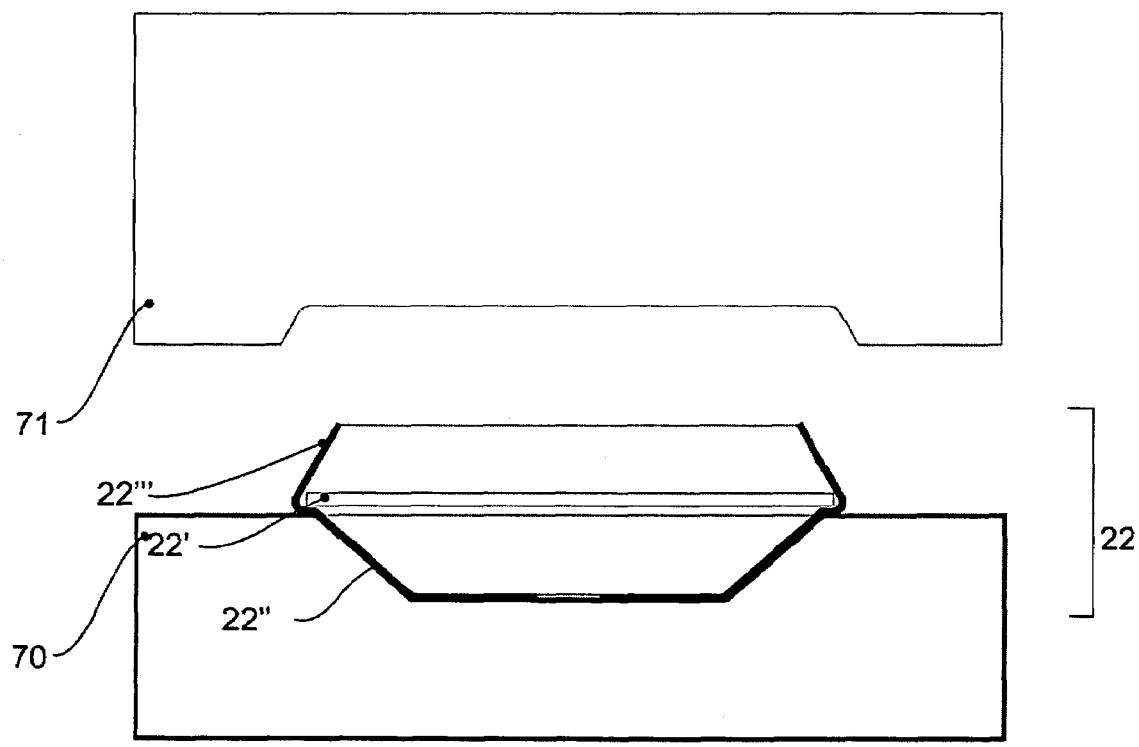
FIG. 25 shows the same alarming device and another design of the assembly holder in its open position.
Figure 26:
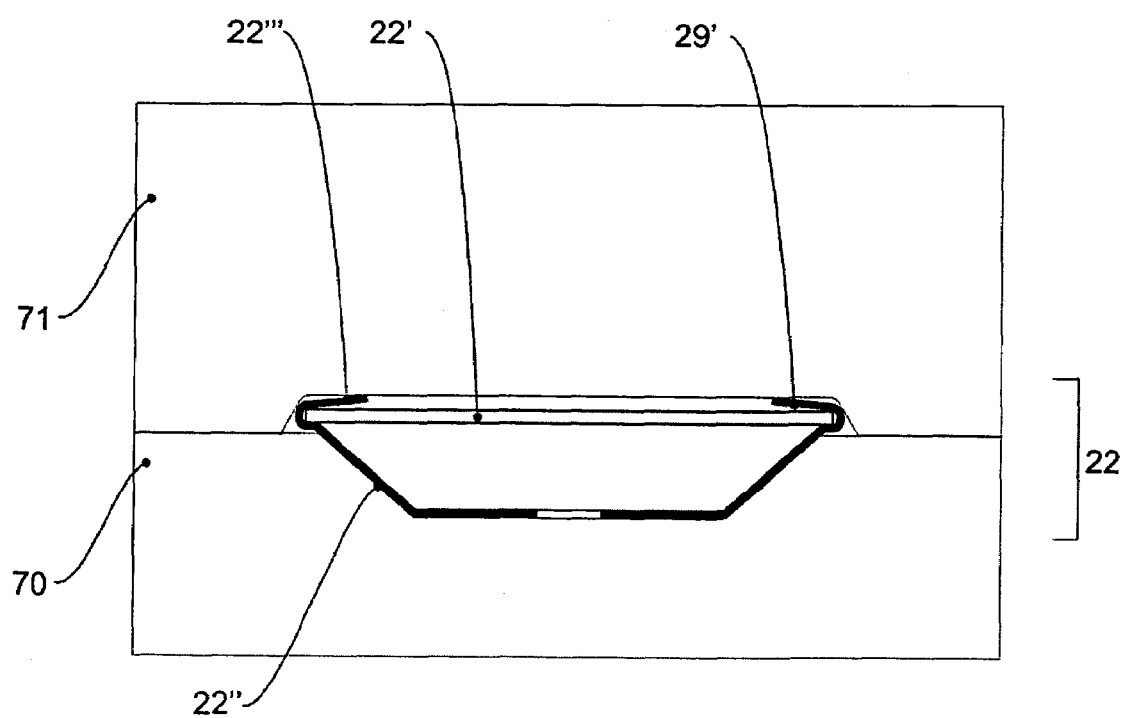
FIG. 26 shows the alarming device of FIG. 25 in the closed position within the assembly holder.

Press means (72) will deform the edges around buzzer 22' into position 29 in FIG. 24. After that, press means (71) in FIG. 25 will further deform the edges of buzzer cover 22' into position 29' in FIG. 26. This method of assembly is only suitable for thick, low output piezo buzzers, since thin, high output buzzers will break during the process.

The invention claims to have a safe and consistent method of using the thin, high output, piezo buzzers in combination with a method buzzer cover without breaking the piezo buzzer, to get a higher output in soundvolume and to eliminate steps in the production process.

By using the very small and thin buzzers, sound output can be even increased significantly by using the right assembly method to create alarming device 22. The invention claims that, after deformation to position 29, no further deformation is added to buzzer cover 22''', therefore having the advantage of less breaking of very vulnerable piezo buzzer 22', higher sound output from alarming device 22, and less production activities to create the alarming device 22, from the two main components 22' and 22". Due to less fixture between buzzer cover 22" and buzzer ', the resonance of the buzzer 22' can create more soundvolume, therefore resulting in an extremely small, low cost, high output, alarming device 22.

Figure 27:
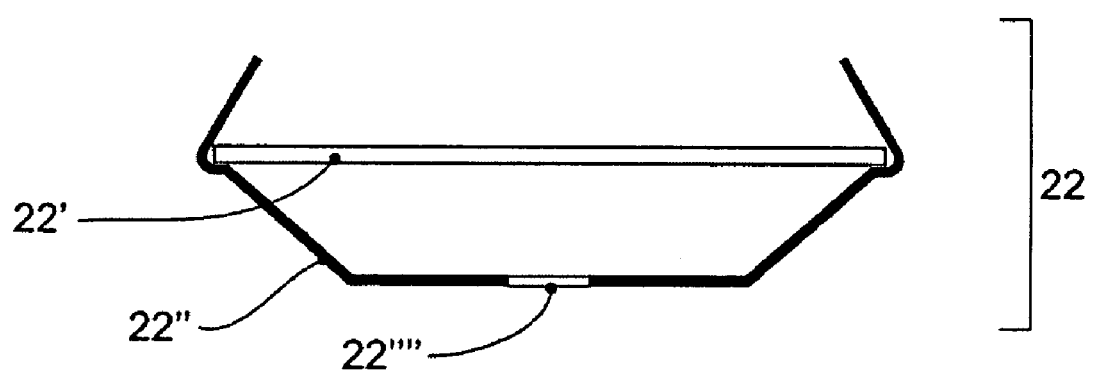
FIG. 27 is a detailed view of the alarming device and the sound hole in the buzzer cover.

Furthermore, the optimal dimension for the sound hole 22"" in buzzer cover 22", in comparison to the diameter of the buzzer 22' and metal buzzer cover 22" is around 1.5 mm, instead of the larger sound holes normally used in buzzer cover in FIG. 27.

The invention claimed is:

1. A hand pressure sensor warning device for use with hand held objects including sports devices, steering devices, writing devices, and computer interface devices, and for generating an alarm signal when the hand or finger pressure being applied to said warning device exceeds a threshold value, said device comprising:

a normally open electrical membrane switch having a first and a second membrane layer, each membrane layer having electrical contact areas including electrically conductive material;

an electrical indicator electrically connected to said electrical membrane switch and having a power supply;

an alarm signal device electrically connected to said electrical indicator for generating an alarm signal; and a housing to enclose said electrical membrane switch, said electrical indicator, and said alarm signal device, a portion of said housing lying in close contact with the membrane switch, whereby the alarm signal device generates an alarm signal when the membrane switch is closed by means of hand or finger pressure applied to the portion of said housing which lies in close contact with said membrane switch, the first membrane layer of said normally open electrical membrane switch including first electrical contact areas and second electrical contact areas which are electrically interconnected to said electrical indicator and separated from one another so as to establish an open electrical switch circuit, and the second membrane layer of said normally open electrical membrane switch including third electrical contact areas which are aligned to engage said first and second electrical contact areas to close the open electrical switch circuit therebetween when the hand or finger pressure applied to the normally open electrical membrane switch which exceeds said threshold value, wherein said first electrical contact areas of the first membrane layer of said normally open membrane switch comprise a first electrical conductor extending from said electrical indicator and a first set of spaced, parallel aligned conductor strips, and said second electrical contact areas of the first membrane layer comprise a second electrical conductor extending from said electrical indicator and a second set of spaced, parallel aligned conductor strips, the first set of conductor strips of said first electrical contact areas being interspersed between the second set of conductor strips of said second electrical contact areas.

2. The hand pressure sensor warning device according to claim 1, wherein the first and second membrane layers of said membrane switch are positioned relative to one another by means of a perforated isolating layer which is located between said membrane layers.

3. The hand pressure sensor warning device according to claim 2, wherein said perforated isolating layer comprises a glue layer provided with openings which correspond to the location of the electrical contact areas of at least one of said first and second membrane layers of said membrane switch.

4. The hand pressure sensor warning device according to claim 1, wherein the third electrical contact areas of the second membrane layer of said membrane switch are spaced, parallel aligned electrically conductive strips that are sized to engage and connect together said first and second sets of conductor strips from the first and second electrical contact areas of said first membrane layer.

5. The hand pressure sensor warning device according to claim 1, wherein the third electrical contact areas of the second membrane layer of said membrane switch are positioned inside of domes formed on said second membrane layer.

6. The hand pressure sensor warning device according to claim 5, wherein the domes formed on the second membrane layer are provided with cuts for reducing the hand or finger threshold value of the membrane switch.

7. The hand pressure sensor warning device according to claim 1, wherein the second membrane layer of said membrane switch includes grooves that extend longitudinally over said second membrane layer to facilitate the lengthwise bending of the membrane switch perpendicular to its longitudinal axis for easy fit around a sport device having a circular cross-section.

8. The hand pressure sensor warning device according to claim 1, wherein the first membrane layer of said membrane switch is provided with means for attaching said warning device to one of said hand held objects to be used therewith.

9. The hand pressure sensor warning device according to claim 8, wherein said attachment means includes an adhesive for easy attachment and removal of the device from said hand held object.

10. A hand pressure sensor warning device for use with hand held objects including sports devices, steering devices, writing devices and computer interface devices, and for generating an alarm signal when the hand or finger pressure being applied to said warning device exceeds a threshold value, said device comprising:

a normally open electrical membrane switch having a first and a second membrane layer, each membrane layer having electrical contact areas including electrically conductive material;

an electrical indicator electrically connected to said electrical membrane switch and having a power supply;

an alarm signal device electrically connected to said electrical indicator for generating an alarm signal; and a housing to enclose said electrical membrane switch, said electrical indicator, and said alarm signal device, a portion of said housing lying in close contact with the membrane switch, whereby the alarm signal device generates an alarm signal when the membrane switch is closed by mans of hand or finger pressure applied to the portion of said housing which lies in close contact with said membrane switch, wherein said electrical indicator is electrically connected to the electrical contact areas of the first membrane layer of said membrane switch, and said housing is located on top of the second membrane layer of said membrane switch to form a bulge over said alarm signal device, said bulge having at least one opening therein to increase the volume of the alarm signal generated by said alarm signal device.

11. A membrane switch for use in a hand pressure sensor warning device and comprising a first membrane layer having first electrical contact areas and second electrical contact areas which are spaced from one another to establish an open electrical switch circuit, a second membrane layer having third electrical contact areas spaced from and aligned with the first and second electrical contact areas of said first membrane layer to close the open electrical switch circuit on the first membrane layer when a hand or finger pressure is exerted on the membrane switch which exceeds a threshold value, an alarm signal device electrically connected to the first and second electrical contact areas of said first membrane layer and adapted to generate an alarm signal when the open electrical switch circuit on the first membrane layer is closed, and a power supply to provide power to said alarm signal device when said electrical switch circuit is closed, wherein said first electrical contact areas of the first membrane layer of said membrane switch comprise a first electrical conductor extending from said power supply and a first set of spaced, parallel aligned conductor strips, and said second electrical contact areas of the first membrane layer comprise a second electrical conductor extending from said power supply and a second set of spaced, parallel aligned conductor strips, the first set of conductor strips of said first electrical contact areas being interspersed between the second set of conductor strips of said second electrical contact areas.

12. A hand pressure sensor warning device for use with hand held objects including sports devices, steering devices, writing devices, and computer interface devices, and for generating an alarm signal when the hand or finger pressure being applied to said warning device exceeds a threshold value, said device comprising:

a normally open electrical membrane switch having a first and a second membrane layer, each membrane layer having electrical contact areas including electrically conductive material;

an electrical indicator electrically connected to said electrical membrane switch and having a power supply;

an alarm signal device electrically connected to said electrical indicator for generating an alarm signal; and a housing to enclose said electrical membrane switch, said electrical indicator, and said alarm signal device, a portion of said housing lying in close contact with the membrane switch, whereby the alarm signal device generates an alarm signal when the membrane switch is closed by means of hand or finger pressure applied to the portion of said housing which lies in close contact with said membrane switch, the first membrane layer of said normally open electrical membrane switch including first electrical contact areas and second electrical contact areas which are electrically interconnected to said electrical indicator and separated from one another so as to establish an open electrical switch circuit, and the second membrane layer of said normally open electrical membrane switch including third electrical contact areas which are aligned to engage said first and second electrical contact areas to close the open electrical switch circuit of the first membrane layer when the hand or finger pressure applied to the membrane switch which exceeds said threshold value, and the second membrane layer of said normally open electrical membrane switch including at least one groove extending longitudinally thereover to facilitate the lengthwise bending of the membrane switch perpendicular to its longitudinal axis for easy fit around a hand held object.

* * * * *